US011947981B2

(12) United States Patent
Anderson et al.

(10) Patent No.: US 11,947,981 B2
(45) Date of Patent: *Apr. 2, 2024

(54) COMPUTING NETWORK FOR IMPLEMENTING A CONTEXTUAL NAVIGATION AND ACTION USER EXPERIENCE FRAMEWORK AND FLATTENING DEEP INFORMATION HIERARCHIES

(71) Applicant: THE TRADE DESK, INC., Ventura, CA (US)

(72) Inventors: Christine Anderson, San Jose, CA (US); Mark A. Patterson, Jr., Wheat Ridge, CO (US); Lina M. Davis, Eagle, CO (US); Stas A. Goldobin, San Francisco, CA (US)

(73) Assignee: The Trade Desk, Inc., Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,981

(22) Filed: Jun. 5, 2023

(65) Prior Publication Data

US 2023/0325212 A1    Oct. 12, 2023

Related U.S. Application Data

(63) Continuation of application No. 17/833,832, filed on Jun. 6, 2022, now Pat. No. 11,669,348, which is a continuation of application No. 17/367,111, filed on Jul. 2, 2021, now Pat. No. 11,354,142.

(51) Int. Cl.
| | |
|---|---|
| G06F 3/0482 | (2013.01) |
| G06F 3/0484 | (2022.01) |
| G06F 9/451 | (2018.01) |
| G06F 16/2457 | (2019.01) |
| G06F 16/28 | (2019.01) |

(52) U.S. Cl.
CPC ............ *G06F 9/451* (2018.02); *G06F 3/0482* (2013.01); *G06F 3/0484* (2013.01); *G06F 16/2457* (2019.01); *G06F 16/289* (2019.01)

(58) Field of Classification Search
None
See application file for complete search history.

(56) References Cited

U.S. PATENT DOCUMENTS

| | | | |
|---|---|---|---|
| 7,792,868 B2 * | 9/2010 | Finkelstein | G06F 16/00 |
| | | | 707/754 |
| 9,524,464 B2 | 12/2016 | Davulcu et al. | |
| 9,613,135 B2 | 4/2017 | Subasic et al. | |
| 10,318,491 B1 | 6/2019 | Graham et al. | |
| 10,848,830 B2 * | 11/2020 | Moreau | H04N 21/482 |
| 11,023,099 B2 * | 6/2021 | Baumecker | G06F 3/0486 |
| 11,354,142 B1 | 6/2022 | Anderson et al. | |

(Continued)

*Primary Examiner* — Ariel Mercado
(74) *Attorney, Agent, or Firm* — Baker & Mckenzie LLP

(57) ABSTRACT

A contextual navigation and action user experience framework that facilitates workflows across multiple contexts and levels of object hierarchy is disclosed. Exemplary features include a swapper interface, an action toolbar with contextual buttons and contextual tabs, and a toolkit that provides an overview portal to view alerts, cross reference information, and perform actions on objects and insights that are important to the user across an entire product suite.

20 Claims, 28 Drawing Sheets

(56) References Cited

U.S. PATENT DOCUMENTS

| | | |
|---|---|---|
| 11,635,978 B2 | 4/2023 | Anderson et al. |
| 2005/0125827 A1 | 6/2005 | Moreau et al. |
| 2006/0129933 A1 | 6/2006 | Land et al. |
| 2008/0115083 A1 | 5/2008 | Finkelstein et al. |
| 2010/0299364 A1 | 11/2010 | Baldwin et al. |
| 2011/0016148 A1 | 1/2011 | Lopes et al. |
| 2012/0075335 A1 | 3/2012 | Hauschild et al. |
| 2012/0089914 A1 | 4/2012 | Holt et al. |
| 2013/0080434 A1 | 3/2013 | Subasic et al. |
| 2014/0351731 A1 | 11/2014 | Claycomb et al. |
| 2015/0121298 A1 | 4/2015 | Ma |
| 2016/0140091 A1* | 5/2016 | Bhat .................... G06F 3/0482 715/854 |
| 2017/0329469 A1* | 11/2017 | Baumecker ......... G06F 3/04845 |
| 2020/0142546 A1 | 5/2020 | Breedvelt-Schouten et al. |
| 2021/0200393 A1 | 7/2021 | Wohlstadter et al. |
| 2023/0004407 A1 | 1/2023 | Anderson et al. |

\* cited by examiner

Target Communicator 3

ALL CAMPAIGNS | CREATIVES | LOCATIONS | GEOS | CAMPAIGN

- Add Rail
- Add Optimization
- Upload Creative
- Build Audience
- Add Site/App List
- Create Locations List
- Edit Goals & Budget
- Manage Fees & Rates

HOME
PLAN
INVENTORY
DATA
REPORTS
LEARN

FY2020 CROSS-TIER PROSPECTING

Smart Categories — 111

| 03/05/19 - 03/31/19 | $9,210.16 | $9,206.16 | 0.055% / 0.700% |
| ALL FLIGHTS | BUDGET | SPEND | ACTUAL / GOAL CTR |

Recommendations
AI has been hard at work optimizing your tiles
*There is a new recommendation for you to review.*

Activity 11/12/2019-12/12/2019
$15K — $3.0
$10K — $2.0
$5K — $1.0
$0 — $0
1 2 3 4 5 6 7
--- Spend  --- CPA

Targeting

Sort By: Name     Search                    1030

∨ RAILS

| Environment | Audience | Creatives |
|---|---|---|
| ○ Mobile Optimized Web, Web (PC & Mobile) | Everyone | 300x250 (1) |
| — RAM | — RAM | — RAM |

COMPUTING NETWORK FOR IMPLEMENTING A CONTEXTUAL NAVIGATION AND ACTION USER EXPERIENCE FRAMEWORK AND FLATTENING DEEP INFORMATION HIERARCHIES

CROSS-REFERENCE TO OTHER APPLICATIONS

This application is a continuation of and claims priority to U.S. application Ser. No. 17/833,832, entitled "Computing Network for Implementing a Contextual Navigation and Action User Experience Framework and Flattening Deep Information Hierarchies," filed on Jun. 6, 2022, now U.S. Pat. No. 11,669,348, issued on Jun. 6, 2023, which claims priority to, and is a continuation of U.S. application Ser. No. 17/367,111, entitled "Computing Network for Implementing a Contextual Navigation and Action User Experience Framework and Flattening Deep Information Hierarchies," filed on Jul. 2, 2021, issued as U.S. Pat. No. 11,354,142 on Jun. 7, 2022, all the disclosures of which are hereby incorporated by reference in their entirety for all purposes.

TECHNICAL FIELD

The present disclosure relates to navigation and action systems.

BACKGROUND

Users of software interfaces are increasingly in need of a user experience framework that provides faster navigation and contextual tools.

SUMMARY

The present disclosure relates to navigation and action systems for flattening deep information hierarchies and contextualizing actions within a multi-product platform, where "flattening" may be defined as making multiple levels of information accessible in one layer and broadening a user's breadth of control.

The user experience framework (UX framework) disclosed may contain one or more of the swapper interface, the action bar, and the toolkit components. These components work in coordination to facilitate workflows across multiple contexts and levels of object hierarchy.

According to one aspect of the subject matter described in this disclosure, the swapper interface may serve as an omnipresent waypoint that allows the user to select an option for one layer. The swapper interface then guides the user to the options they are most likely to choose for subsequent layers. Users may also swiftly swap between multiple layer contexts without having to re-traverse a navigation tree. The swapper interface takes two levels of object hierarchy and transforms them into a workflow context rather than a hierarchy, allowing a sequence of like-operations across multiple contexts to be done efficiently. In some embodiments, the swapper interface enables bypassing of object (e.g., communicator hub) and/or data (e.g., target communicator) hierarchies.

According to another aspect of the subject matter described in this disclosure, the action bar makes thousands of features easy to discover and use. The action bar floats above the pages, showcasing the buttons that trigger features the page supports. In this context, the term "button" may be used in reference to an option. The action bar may personalize the button layout for individual pages—grouping like-buttons together, sorting high usage and important features to the left, importing features from other platform pages when they support a broader workflow, and showing or hiding functionality as dictated by the user's roles and permissions.

The action bar has access to features across an entire product suite and is populated by the user's context. The action bar acts like a complete content management system, polling the user's roles, the object hierarchy context, the page content, and complementary product features simultaneously to populate the action bar with features and buttons. The action bar shows the user what is important, rather than just what is in focus. The action bar buttons can change state depending on what is selected in the workspace, but each page's action bar may show the full set of features and their associated buttons visible to support the user's feature discovery experience. Whenever the user begins new workflows that require additional features, they may be redirected to new workspaces with their associated action bars in new core or contextual tabs.

The action bar may also contain a navigation panel that allows users to switch between platform sections that support specific workflows. Each section may contain multiple pages in core tabs for secondary navigation. Each core tab may open child pages in contextual tabs. Each contextual tab may open its own child pages or sibling pages to support the user's workflow. Contextual tabs may be opened side-by-side with core tabs, resulting in the display of parent, child, sibling, and grandchild pages within one level of visual hierarchy.

The toolkit is both the user's backpack, filled with useful multitools, and a second pair of hands that can wield said tools. The toolkit parses and displays insights, actions, and shortcuts based on the current page's content, the user's role, and the communicator hub or target communicator whom they are working for. The user may choose to change the toolkit's context to contrast, compare, and cross-reference either (1) the same objects, insights, and associated actions for a different target communicators, or (2) different objects, insights, and associated actions for the same target communicator.

Some UX framework components may be hidden so that the user can focus on their content. The framework can be shifted between different modes: the standard execution mode, a presentation mode for collaboration and review, an education mode, and a recommendation mode to guide users through tactic optimizations.

The UX framework is scalable and consistent. It supports pages built in multiple disparate web technologies, where web technologies are defined as various tools and techniques that are used in the process of communication between different types of devices over the internet. The UX framework can accommodate a dramatic expansion of user types, permissions, and roles. It can also route users to the appropriate section of the platform on login based on their organizational responsibilities.

In some embodiments, a method is provided for bypassing data hierarchies in data associated with objects, the method comprising: providing, using one or more computing device processors, a primary set of objects; receiving, using the one or more computing device processors, a selection of a first object from the primary set of objects; in response to receiving the selection of the first object from the primary set of objects, providing, using the one or more computing device processors, a secondary set of objects based on the selection of the first object from the primary set of objects, wherein the secondary set of objects comprises a set of target communicators, communications, or campaigns; receiving, using the one or more computing device processors, a selection of a second object from the secondary set of objects; in response to receiving the selection of the second object from the secondary set of objects, providing, using the one or more computing device processors, data associated with the second object, wherein the data associated with the second object comprises a first data hierarchy associated with the second object; receiving, using the one or more computing device processors, a selection of first category data from the data associated with the second object; in response to receiving the selection of the first category data from the data associated with the second object, providing, using the one or more computing device processors, the first category data associated with the second object; receiving, using the one or more computing device processors, a selection of a third object from the secondary set of objects; and in response to receiving the selection of the third object from the secondary set of objects, bypassing, using the one or more computing device processors, a second data hierarchy associated with the third object and providing, using the one or more computing device processors, first category data associated with the third object, without providing data associated with the third object and without receiving a selection of the first category data associated with the third object, wherein the first category data associated with the second object and the first category data associated with the third object are available for the second object and the third object, respectively.

In some embodiments, the method further comprises: providing a set of selectable categories based on a profile of a user and based on the selection of the first object from the primary set of objects or the selection of the second object from the secondary set of objects.

In some embodiments, the set of selectable categories is based on a history of categories selected by the user.

In some embodiments, the method further comprises filtering objects based on a first selected category from the set of selectable categories.

In some embodiments, the set of selectable categories is comprised in or comprises the first category data associated with the second object or the first category data associated with the third object.

In some embodiments, data associated with the first object, first category data associated with the first object, the data associated with the second object, or the first category data associated with the second object is based on a profile or a history of the user.

In some embodiments, the primary set of objects, the secondary set of objects, and a set of categories associated with the secondary set of objects are positioned in a first selection pane, a second selection pane, and a third selection pane, respectively.

In some embodiments, the method further comprises converting a visual representation of the second object from a first state to a second state in response to the selection of the second object.

In some embodiments, the visual representation of the second object continues to be in the second state when providing the first category data associated with the third object without providing the data associated with the third object and without receiving the selection of the first category data associated with the third object.

In some embodiments, the method further comprises providing an exception when receiving a selection for data not permitted for access by a user.

In some embodiments, the method further comprises providing a badge for at least one of the first object, data associated with the first object, the second object, or the data associated with the second object, wherein the badge provides a message to a user regarding status.

In some embodiments, the method further comprises searching for at least one of the first object, data associated with the first object, the second object, or the data associated with the second object.

In some embodiments, the method further comprises saving workflow associated with at least one of the first object, data associated with the first object, the second object, or the data associated with the second object.

In some embodiments, the primary set of objects comprises a set of communicator hubs.

In some embodiments, an apparatus is provided for bypassing data hierarchies associated with objects, the apparatus comprising one or more computing device processors configured to: provide a primary set of objects, wherein the primary set of objects comprises a set of communicator hubs; receive a selection of a first object from the primary set of objects; in response to receiving the selection of the first object from the primary set of objects, provide a secondary set of objects based on the selection of the first object from the primary set of objects; receive a selection of a second object from the secondary set of objects; in response to receiving the selection of the second object from the secondary set of objects, provide data associated with the second object; receive a selection of first category data from the data associated with the second object, wherein the data associated with the second object comprises a first data hierarchy associated with the second object; in response to receiving the selection of the first category data from the data associated with the second object, provide the first category data associated with the second object; receive a selection of a third object from the secondary set of objects; and in response to receiving the selection of the third object from the secondary set of objects, bypass a second data hierarchy associated with the third object and provide first category data associated with the third object without providing data associated with the third object and without receiving a selection of the first category data associated with the third object, wherein the first category data associated with the second object and the first category data associated with the third object are available for the second object and the third object, respectively.

In some embodiments, the apparatus comprises at least one of a server or a computing apparatus associated with a user.

In some embodiments, a method is provided for bypassing data hierarchies associated with objects, the method comprising: providing, using one or more computing device processors, a primary set of objects; receiving, using the one or more computing device processors, a selection of a first object from the primary set of objects; in response to receiving the selection of the first object from the primary set of objects, providing, using the one or more computing device processors, a secondary set of objects based on the selection of the first object from the primary set of objects; receiving, using the one or more computing device processors, a selection of a second object from the secondary set of objects; in response to receiving the selection of the second object from the secondary set of objects, providing, using the one or more computing device processors, data associated with the second object, wherein the data associated with the second object comprises a first data hierarchy associated with the second object; receiving, using the one or more computing device processors, a selection of first category data from the data associated with the second object; in response to receiving the selection of the first category data from the data associated with the second object, providing, using the one or more computing device processors, the first category data associated with the second object; receiving, using the one or more computing device processors, a selection of a third object from the secondary set of objects; and in response to receiving the selection of the third object from the secondary set of objects, bypassing, using the one or more computing device processors, a second data hierarchy associated with the third object and providing, using the one or more computing device processors, first category data associated with the third object without providing data associated with the third object and without receiving a selection of the first category data associated with the third object, wherein the first category data associated with the second object and the first category data associated with the third object are available for the second object and the third object, respectively.

In some embodiments, the second object and the third object are part of an object hierarchy associated with the first object.

In some embodiments, the method further comprises bypassing the object hierarchy associated with the first object.

In some embodiments, the data associated with the third object comprises the first category data associated with the third object.

In some embodiments, a method is provided for bypassing data hierarchies associated with objects, the method comprising: initiating, using one or more computing device processors, display of a first interface; providing, using the one or more computing device processors, a primary set of objects on the first interface; receiving, using the one or more computing device processors, a selection of a first object from the primary set of objects; in response to receiving the selection of the first object from the primary set of objects, populating, using the one or more computing device processors, based on the first object, on the first interface, a first secondary set of contextual objects related to the first object, wherein the first secondary set of contextual objects comprises a first contextual object; populating, using the one or more computing device processors, based on the first contextual object, by bypassing user navigation of a hierarchy of contextual objects related to the first contextual object or the first object, on the first interface, a second contextual object from the hierarchy of contextual objects related to the first contextual object or the first object; receiving, using the one or more computing device processors, a selection of the first contextual object comprised in the first secondary set of contextual objects; in response to receiving the selection of the first contextual object comprised in the first secondary set of contextual objects, providing, using the one or more computing device processors, data associated with the first contextual object; receiving, using the one or more computing device processors, a selection of the second contextual object; in response to receiving the selection of the second contextual object, providing, using the one or more computing device processors, data associated with the second contextual object; receiving, using the one or more computing device processors, a selection of a second object from the primary set of objects; and in response to receiving the selection of the second object from the primary set of objects, populating, using the one or more computing device processors, based on the second object, on the first interface, a second secondary set of contextual objects related to the second object, wherein the first secondary set of contextual objects are no longer visible on the first interface when the first interface is populated with the second secondary set of contextual objects, and wherein the first object is still visible on the first interface when the first interface is populated with the second secondary set of contextual objects.

In some embodiments, an apparatus is provided for data associated with objects, the apparatus comprising one or more hardware computing device processors configured to: initiate display of a first interface; provide a primary set of objects on the first interface; receive a selection of a first object from the primary set of objects; in response to receiving the selection of the first object from the primary set of objects, populate, based on the first object, on the first interface, a first secondary set of contextual objects related to the first object, wherein the first secondary set of contextual objects comprises a first contextual object; populate, based on the first contextual object, by bypassing user navigation of a hierarchy of contextual objects related to the first contextual object or the first object, on the first interface, a second contextual object from the hierarchy of contextual objects related to the first contextual object or the first object; receive a selection of the first contextual object; in response to receiving the selection of the first contextual object, provide data associated with the first contextual object; receive a selection of the second contextual object; in response to receiving the selection of the second contextual object, provide data associated with the second contextual object; receive a selection of a second object from the primary set of objects; and in response to receiving the selection of the second object from the primary set of objects, populate, based on the second object, on the first interface, a second secondary set of contextual objects related to the second object, wherein the first secondary set of contextual objects are not visible on the first interface when the first interface is populated with the second secondary set of contextual objects, and wherein the first object remains visible on the first interface when the first interface is populated with the second secondary set of contextual objects.

In some embodiments, the apparatus comprises at least one of a server or a computing apparatus associated with a user.

In some embodiments, a method is provided for data associated with objects, the method comprising: initiating, using one or more computing device processors, display of a first interface; providing, using the one or more computing device processors, a primary set of objects on the first interface; receiving, using the one or more computing device processors, a selection of a first object from the primary set of objects; in response to receiving the selection of the first object from the primary set of objects, populating, using the one or more computing device processors, based on the first object, on the first interface, a first secondary set of contextual objects related to the first object, wherein the first secondary set of contextual objects comprises a first contextual object; populating, using the one or more computing device processors, based on the first contextual object, without requiring a user to navigate a hierarchy of contextual objects related to the first contextual object or the first object, on the first interface, a second contextual object from the hierarchy of contextual objects related to the first contextual object or the first object; receiving, using the one or more computing device processors, a selection of the first contextual object; in response to receiving the selection of the first contextual object, providing, using the one or more computing device processors, data associated with the first contextual object; receiving, using the one or more computing device processors, a selection of the second contextual object; in response to receiving the selection of the second contextual object, providing, using the one or more computing device processors, data associated with the second contextual object; receiving, using the one or more computing device processors, a selection of a second object from the primary set of objects; and in response to receiving the selection of the second object from the primary set of objects, populating, using the one or more computing device processors, based on the second object, on the first interface, a second secondary set of contextual objects related to the second object.

In some embodiments, the method further comprises providing, using the one or more computing device processors, a navigation panel comprising a set of navigating objects separate from the primary set of objects, the first secondary set of contextual objects, and the second secondary set of contextual objects.

In some embodiments, the primary set of objects are provided based on a role or permission of the user.

In some embodiments, the first secondary set of contextual objects are no longer visible on the first interface when the first interface is populated with the second secondary set of contextual objects.

In some embodiments, the method further comprises maintaining a scroll position or history of at least one object in the primary set of objects or the first secondary set of contextual objects, during a session.

In some embodiments, the first contextual object comprises a first tab and the second contextual object comprises a second tab.

In some embodiments, the method further comprises maintaining the first secondary set of contextual objects during a session.

In some embodiments, the method further comprises collapsing the primary set of objects based on a dimension of the first interface.

In some embodiments, the first contextual object or the second contextual object comprises a recently viewed object.

In some embodiments, the method further comprises enabling toggling among one or more objects on the first interface, wherein the one or more objects comprises one or more target communicators, communications, campaigns, or hubs.

In some embodiments, the primary set of objects comprises one or more selectable core tabs.

In some embodiments, the first secondary set of contextual tabs comprises one or more selectable contextual tabs.

In some embodiments, the first contextual object is presented adjacent to the first object, on the first interface.

In some embodiments, the first object is automatically selected from the primary set of objects following the initiating the display of the first interface.

In some embodiments, the first secondary set of contextual objects are no longer visible on the first interface, but maintained by the one or more computing device processors, when the first interface is populated with the second secondary set of contextual objects.

In some embodiments, the method further comprises providing a badge for at least one object in the primary set of objects or the first secondary set of contextual objects, wherein the badge provides a status of the at least one object.

In some embodiments, a method is provided for bypassing data hierarchies associated with objects, the method comprising: providing, using one or more computing device processors, a primary set of objects; receiving, using the one or more computing device processors, a selection of a first object from the primary set of objects; in response to receiving the selection of the first object from the primary set of objects, providing, using the one or more computing device processors, a secondary set of objects based on the selection of the first object from the primary set of objects, wherein the secondary set of objects comprises a set of target communicators, communications, or campaigns; receiving, using the one or more computing device processors, a selection of a second object from the secondary set of objects; in response to receiving the selection of the second object from the secondary set of objects, providing, using the one or more computing device processors, data associated with the second object, wherein the data associated with the second object comprises a first data hierarchy associated with the second object; receiving, using the one or more computing device processors, a selection of first category data from the data associated with the second object; in response to receiving the selection of the first category data from the data associated with the second object, providing, using the one or more computing device processors, the first category data associated with the second object; receiving, using the one or more computing device processors, a selection of a third object from the secondary set of objects; and in response to receiving the selection of the third object from the secondary set of objects, bypassing, using the one or more computing device processors, a second data hierarchy associated with the third object and providing, using the one or more computing device processors, first category data associated with the third object without providing data associated with the third object and without receiving a selection of the first category data associated with the third object, wherein the first category data is available for the third object.

In some embodiments, an apparatus is provided for bypassing data hierarchies associated with objects, the apparatus comprising one or more computing device processors configured to: provide a primary set of objects, wherein the primary set of objects comprises a set of communicator hubs; receive a selection of a first object from the primary set of objects; in response to receiving the selection of the first object from the primary set of objects, provide a secondary set of objects based on the selection of the first object from the primary set of objects; receive a selection of a second object from the secondary set of objects; in response to receiving the selection of the second object from the secondary set of objects, provide data associated with the second object; receive a selection of first category data from the data associated with the second object, wherein the data associated with the second object comprises a first data hierarchy associated with the second object; in response to receiving the selection of the first category data from the data associated with the second object, provide the first category data associated with the second object; receive a selection of a third object from the secondary set of objects; and in response to receiving the selection of the third object from the secondary set of objects, bypass a second data hierarchy associated with the third object and provide first category data associated with the third object without providing data associated with the third object and without receiving a selection of the first category data associated with the third object wherein the first category data is available for the third object.

In some embodiments, the apparatus comprises at least one of a server or a computing apparatus associated with a user.

In some embodiments, a method is provided for bypassing data hierarchies associated with objects, the method comprising: providing, using one or more computing device processors, a primary set of objects; receiving, using the one or more computing device processors, a selection of a first object from the primary set of objects; in response to receiving the selection of the first object from the primary set of objects, providing, using the one or more computing device processors, a secondary set of objects based on the selection of the first object from the primary set of objects; receiving, using the one or more computing device processors, a selection of a second object from the secondary set of objects; in response to receiving the selection of the second object from the secondary set of objects, providing, using the one or more computing device processors, data associated with the second object, wherein the data associated with the second object comprises a first data hierarchy associated with the second object; receiving, using the one or more computing device processors, a selection of first category data from the data associated with the second object; in response to receiving the selection of the first category data from the data associated with the second object, providing, using the one or more computing device processors, the first category data associated with the second object; receiving, using the one or more computing device processors, a selection of a third object from the secondary set of objects; and in response to receiving the selection of the third object from the secondary set of objects, bypassing, using the one or more computing device processors, a second data hierarchy associated with the third object and providing, using the one or more computing device processors, first category data associated with the third object without receiving a selection of the first category data associated with the third object, wherein the first category data is available for the third object.

In some embodiments, the method further comprises providing, using the one or more computing device processors, the first category data associated with the third object without providing data associated with the third object.

In some embodiments, the second object or the third object is part of an object hierarchy.

In some embodiments, the method further comprises bypassing the object hierarchy.

In some embodiment, the method further comprising: providing selectable categories based on a user profile or user history, or based on the selection of the first object from the primary set of objects or the selection of the second object from the secondary set of objects.

In some embodiments, the method further comprises: prioritizing data or objects from the primary set of objects or the secondary set of objects.

In some embodiments, the method further comprises filtering data or objects from at least one of the primary set of objects, first categories associated with the primary set of objects, the second set of objects, or second categories associated with the second set of objects.

In some embodiments, data associated with the first object, the first category data associated with the first object, the data associated with the second object, or the first category data associated with the second object, is based on a profile or history of a user.

In some embodiments, a location on a user interface of at least one of data associated with the first object, the first category data associated with the first object, the data associated with the second object, or the first category data associated with the second object, is based on a profile or history of a user, or is based on a parameter.

In some embodiments, the primary set of objects, the secondary set of objects, and categories associated with the secondary set of objects are positioned in a first selection pane, a second selection pane, and a third selection pane, respectively.

In some embodiments, the method further comprises converting a visual representation of the second object from a first state to a second state in response to the selection of the second object.

In some embodiments, the visual representation of the second object continues to be in the second state when providing the first category data associated with the third object without receiving the selection of the first category data associated with the third object.

In some embodiments, the method further comprises providing an exception when receiving a selection for data not permitted for access by a user.

In some embodiments, the method further comprises providing a badge for at least one of the first object, data associated with the first object, the second object, the data associated with the second object, or the third object, wherein the badge provides a message to a user regarding status.

In some embodiments, the method further comprises searching for at least one of the first object, data associated with the first object, the second object, the data associated with the second object, or the third object.

In some embodiments, the method further comprises saving workflow associated with at least one of the first object, data associated with the first object, the second object, the data associated with the second object, or the third object.

In some embodiments, the primary set of objects comprises a set of communicator hubs.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

FIG. 10A shows the leftmost portion of an example of a creatives toolkit, according to one embodiment.

FIG. 14A shows the leftmost portion of an example of a site/app toolkit, according to one embodiment.

FIG. 15A shows the leftmost portion of an example of a locations toolkit, according to one embodiment.

DETAILED DESCRIPTION

Figure 1:
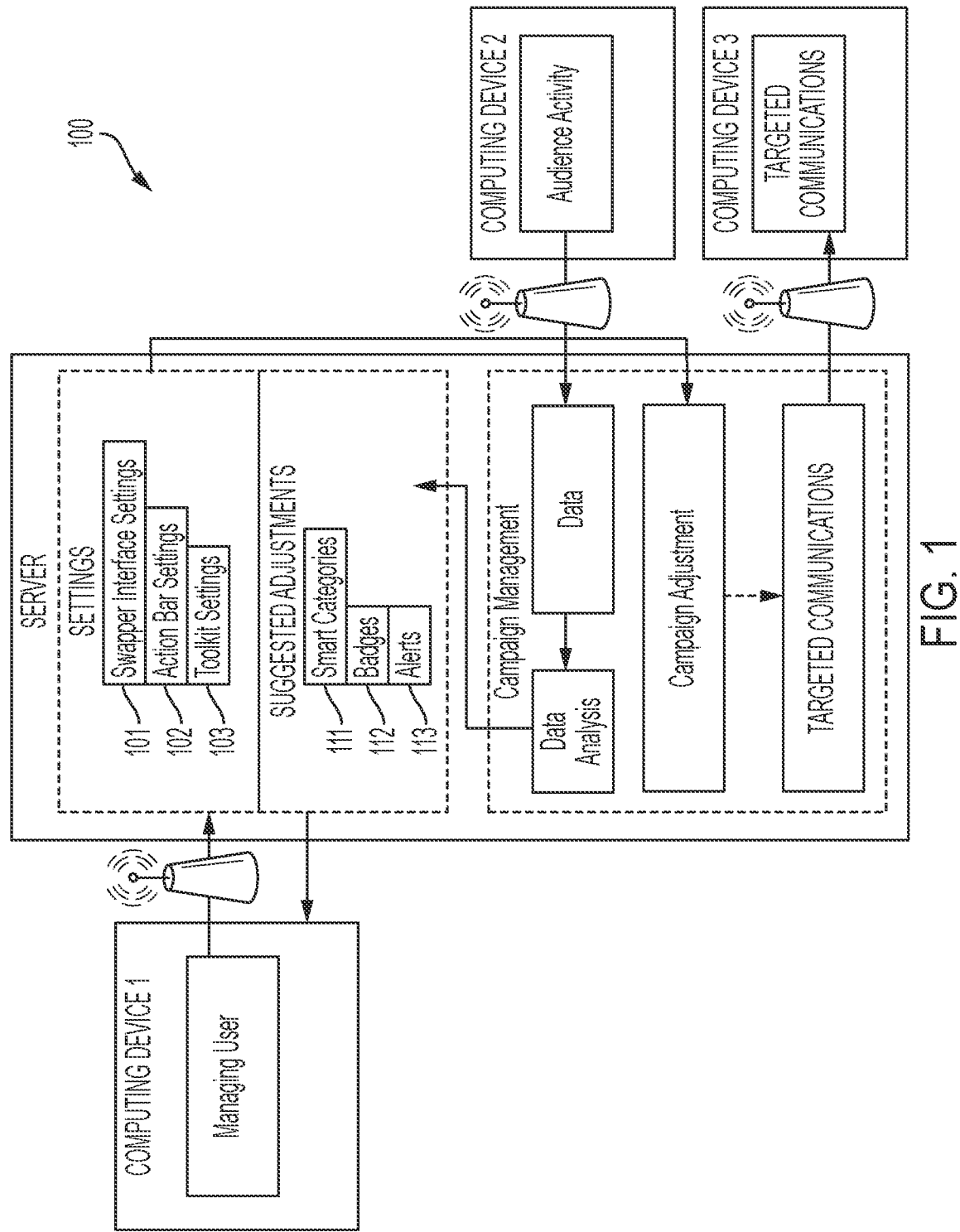
FIG. 1 shows a schematic block of a system for managing campaigns and generating targeted communications in accordance with some disclosed embodiments.

The present disclosure relates to navigation and action systems for flattening deep information hierarchies and contextualizing actions within a multi-product platform, where "flattening" may be defined as making multiple levels of information accessible in one layer and broadening a user's breadth of control.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill in the art may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

The UX framework disclosed may be designed for use with desktop computers, laptop computers, mobile devices, or any other device capable of receiving and transmitting information through a user interface. The term "button" as used herein to refers to an option.

The UX framework may be used to optimize targeted communications, particularly by "communicator hubs" that are responsible for managing many streams of targeted communications. The term "targeted communications" may, in some embodiments, include bids, advertisements, or messages. Communicator hubs may be responsible for operating digital campaigns on behalf of multiple "target communicators." The term "campaign" may refer to strategies for managing the dispersal of targeted communications to achieve a desired objective. Examples of target communicators may include advertisers, news agencies, or any person or entity that sends out targeted communications. In order to operate digital campaigns, communicator hubs may engage digital campaign experts or "managing users". Target communicators share their objectives with communicator hubs. Managing users translate objectives into multiple, executable campaigns. Each campaign is composed of multiple strategies, or "groups". Groups attempt to find, test, and scale ways to meet the objectives over a set period of time. Each group is composed of targeting rails and optimization rails. Targeting rails provide the target communicator with data concerning how, where, and to whom the targeted communications are being transmitted. Optimization rails allow the target communicator to establish parameters for making campaign management decisions and optimizing campaign success.

The contextual navigation and action UX framework achieves an efficient user experience that creates a dialog with the user in part by making deep information hierarchies accessible in one layer and personalizing each page in a multi-product platform based on the user's role, the user's workflows, the object, and target communicator context.

The UX framework takes an information hierarchy (IA) with multiple (e.g., seven) levels of navigation, which requires multiple screens and browser windows to use successfully, and transforms it into a flattened IA that is multiple (e.g., two) levels deep, can be used in a single browser window, and guides users to successfully complete their targeted communication workflows.

The UX framework acts as a personalized content management system, morphing the features and tools displayed to the user based on the user's roles, the objects they are working on, and the target communicators the user is working for.

In some embodiments, the UX framework has a visible navigation system in which users do not need to lose their page and re-traverse a navigation tree to change their location in the hierarchy. In some embodiments, the UX framework makes the breadth of objects and features available and discoverable across multiple pages. In some embodiments, the UX framework is organized such that each product in the suite is a click away rather than hidden as a separate website or application.

Since managing users may work with multiple target communicators at a time, in some embodiments, the UX framework brings to attention insights, warnings, notifications, and status changes based on the target communicators' unique goals wherever the managing user is in the platform. For example, if a managing user is working on object B, under target communicator B, the UX framework will bring to attention insights about object A, under target communicator A when it is pertinent.

In some embodiments, the UX framework may also load pages written in disparate web technologies within one unified framework, where web technologies are defined as various tools and techniques that are used in the process of communication between different types of devices over the internet and unified framework is defined as an integrated system of processing information derived from such disparate web technologies and presenting that information in a uniform format.

The UX framework may comprise one or more unique features, including the swapper interface, the action bar, and the toolkit.

System Environment

Illustrated in FIG. 1 is a high level system 100 for managing targeted communication campaigns using multiple user interfaces. In the depicted implementation, the system 100 may comprise receiving, at one or more servers or on an external server, audience activity from one or more computing devices. In some embodiments, the audience activity may be audience targeted communication activity. In the depicted implementation, the system may further comprise generating data; analyzing data; generating one or more of smart categories 111, badges 112, or alerts 113, where smart categories are user-directed or situationally-dependent pre-populated lists of target communicators; alerting the managing user on a different computing device; showcasing data to the managing user through the swapper interface settings 101, action bar settings 102, and toolkit settings 103; generating campaign adjustments through the action bar settings 102 and toolkit settings 103; generating targeted communications; and transmitting the targeted communications to one or more computing devices.

Figure 2:
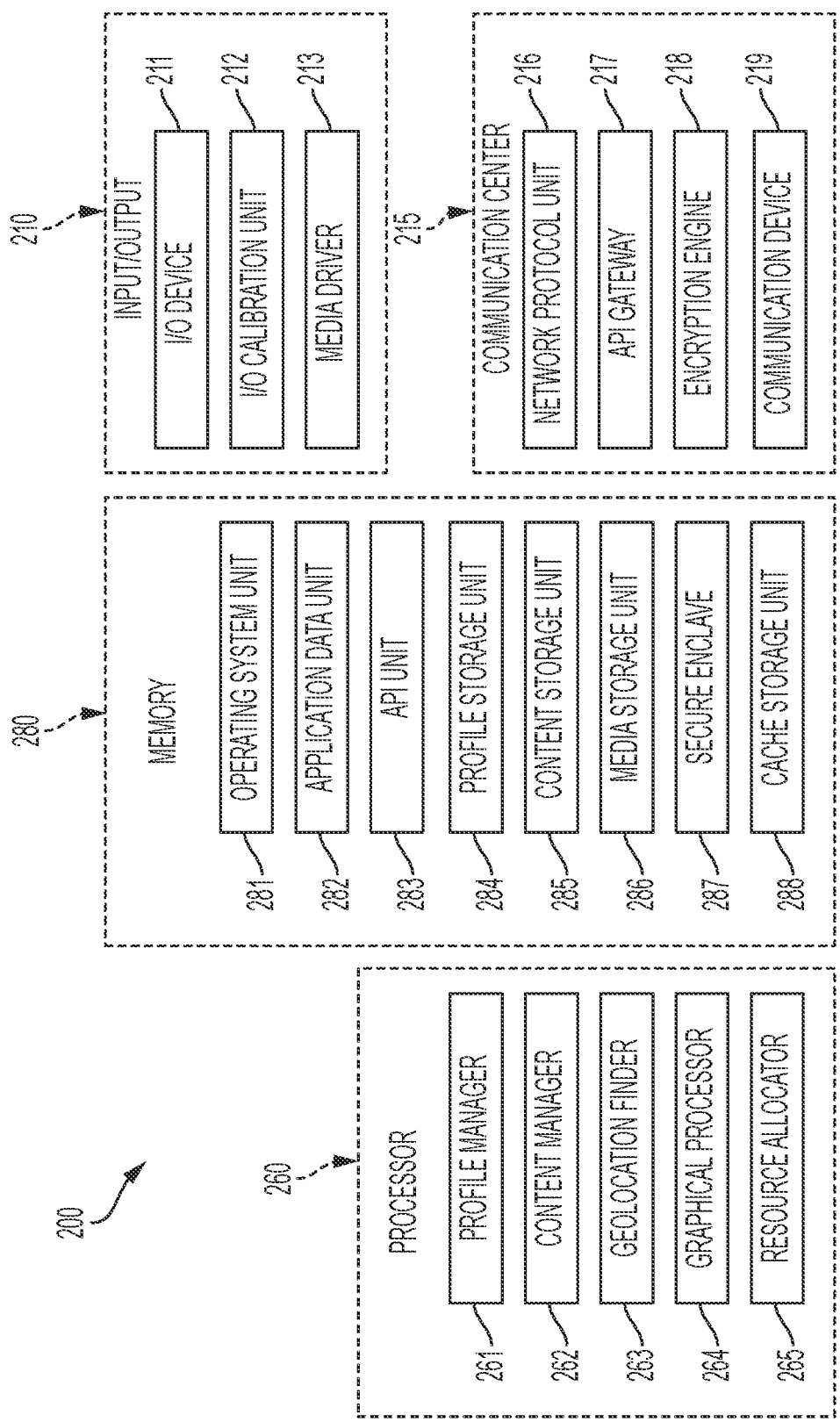
FIG. 2 shows a functional block diagram of a server for managing campaigns and generating targeted communications associated with some embodiments of the disclosed system.

According to some embodiments and as illustrated in FIG. 2, a server 200 may include, among other elements, any combination of a processor 260, a memory 280, an input/output (I/O) 210, and a communication center 215. As described in present embodiments, each of the processor 260, the memory 280, the I/O 210, and communication center 215 may include a plurality of respective units, subunits, and/or elements. Furthermore, each of the processor 260, the memory 280, the I/O 210, and the communication center 215 may be operatively or otherwise communicatively coupled with each other so as to facilitate the methods and techniques described herein.

The processor 260 may control any one or more of the memory 280, the I/O 210, the communication center 215, or any other unit which may include the server 200, as well as any included subunits, elements, components, devices, or functions performed by each or a combination of the memory 280, the I/O 210, the communication center 215 or any other unit which may include the server 200. Any of the elements or sub-elements of the server 200 presented here may also be included in a similar fashion in any of the other units, subunits, and devices included in the system 100 of FIG. 1. Additionally, any actions described herein as being performed by a processor 260 may be taken by the processor 260 alone, or by the processor 260 in conjunction with one or more additional processors, units, subunits, elements, components, devices, and the like. Additionally, while only one processor 260 may be shown in the figures included here, multiple processors may be present or otherwise included in the server 200, on an external server, or elsewhere in the system 100 of FIG. 1. Thus, while instructions may be described as being executed by the processor 260 or the various subunits of the processor 261, 262, 263, 264, 265, the instructions may be executed simultaneously, serially, or otherwise by one or more multiple processors 260.

In some embodiments, a processor 260 may be implemented as one or more computer processor (CPU) chips, graphical processor (GPU) chips, or some combination of CPU chips and GPU chips, and may include a hardware device capable of executing computer instructions. The processor 260 may execute any combination of instructions, codes, computer programs, and scripts. The instructions, codes, computer programs, and scripts may be received from, stored in, or received from and stored in any combination of the memory 280, the I/O 210, the communication center 215, subunits of the previously described elements, other devices, other computing environments. In some embodiments, non-transitory computer-readable medium comprising code may be provided to perform one or more of the various processes, methods, functions, etc. described herein.

In some embodiments, the processor 260 may include, among other elements, subunits. Subunits may include any combination of a profile manager 261, a content manager 262, a geolocation finder 263, a graphical processor 264, and a resource allocator 265. Each of these subunits of the processor 260 may be communicatively or otherwise operably coupled with each other.

The profile manager 261 may facilitate any combination of generation, modification, analysis, transmission, and presentation of a user profile associated with a user, e.g. first user, second user, etc. For example, the profile manager 261 may prompt a user, through a first user device or a second user device, to register by inputting authentication credentials, personal identifying information, contact information, preferred buying habits, location, or any other information which may be associated with generating a personal profile for the user. The profile manager 261 may also control or utilize an element of the I/O 210 to enable a user to take a picture or video of themselves or another person. The profile manager 261 may receive, process, analyze, organize, transform, or any combination of these, any received from the user or another computing element as to generate a user profile of a user that may include any combination of personal information, contact information, user preferences, photos, videos, audio clips, a history of user activity, user preferences, user search history, user location, settings, and the like.

The content manager 262 may facilitate any combination of generation, modification, analysis, transmission, and presentation of media content associated with methods and systems for network communication disintermediation. For example, the content manager 262 may control the environment of the application during the execution of various processes. For purposes of illustration and not limitation, media content for which the content manager 262 may be responsible may include any combination of advertisements, images, text, themes, audio files, video files, documents, and the like. In some embodiments, the content manager 262 may also interface with any combination of a third-party content server, memory location, and/or a database.

The geolocation finder 263, particularly in communication with geolocation information, e.g., provided by GPS subsystems of user devices, may facilitate any combination of detection, generation, modification, analysis, transmission, and presentation of location information. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. In some embodiments, the geolocation finder 263 may include any one or a combination of various sensors, specifically-purposed hardware elements for enabling the geolocation finder 263 to acquire, measure, and transform location information.

The graphical processor (GPU) 264 may facilitate any combination of generation, modification, analysis, processing, transmission, and presentation of visual content. The GPU 264 may be configured to render visual content for presentation on a user device and/or to analyze visual content for metadata associated with a user or a user device. In some embodiments, this visual content may include the display of search result and/or activatable communication channels. The GPU 264 may include multiple GPUs and may therefore be configured to perform and/or execute multiple processes in parallel.

The resource allocator 265 may facilitate any one or combination of the determination, monitoring, analysis, and allocation of resources throughout the server 200, the system 100, any component of the system 100, or other computing environments. For example, the resource allocator 265 may facilitate interaction between the server 200, any subunit of the server 200, and a high volume (e.g. multiple) of users or associated user devices. As such, computing resources of the server 200 utilized by any one or a combination of the processor 260, the memory 280, the I/O 210, the communication center 215, and any subunit of these units, such as processing power, data storage space, network bandwidth, and the like may be in high demand at various times during operation. Accordingly, the resource allocator 265 may be configured to manage the allocation of various computing resources as they are required by particular units or particular subunits of the server 200.

In some embodiments, the resource allocator 265 may include sensors and/or other specially-purposed hardware for monitoring performance of each unit and/or subunit of the server 200, as well as hardware for responding to the computing resource needs of each unit or subunit. In some embodiments, the resource allocator 265 may utilize computing resources of a second computing environment separate and distinct from the server 200 to facilitate a desired operation.

In some embodiments, factors affecting the allocation of computing resources by the resource allocator 265 may include the number of ongoing user device connections and/or other communication channel connections, a duration during which computing resources are required by one or more elements of the server 200, and/or the like. In some embodiments, computing resources may be allocated to and/or distributed amongst a plurality of second computing environments included in the server 200 based on one or more factors mentioned above. In some embodiments, the allocation of computing resources of the resource allocator 265 may include one or more resource allocators 265 flipping a switch, adjusting processing power, adjusting memory size, partitioning a memory element, transmitting data, controlling one or more input and/or output devices, modifying various communication protocols, and the like. In some embodiments, the resource allocator 265 may facilitate utilization of parallel processing techniques such as dedicating a plurality of GPUs included in the processor 260.

The processor 260 and any or all of the processor subunits, including subunits 261, 262, 263, 264, and 265, may be used to execute processes initiated by swapper interface settings 101, action bar settings 102, and toolkit settings 103.

In some embodiments, the memory 280 may be used for one or any combination of storing, recalling, receiving, transmitting, and/or accessing various files and/or information during operation of the server 200. The memory 280 may additionally be used for storing, recalling, and/or updating user profile information and the like. The memory 280 may include various types of data storage media such as solid state storage media, hard disk storage media, and any other type of data storage medium which may be known to a person of ordinary skill in the art. The memory 280 may include dedicated hardware elements such as hard drives and/or servers, as well as software elements such as cloud-based storage drives. For example, the memory 280 may include various subunits such as an operating system unit 281, an application data unit 282, an application programming interface (API) unit 283, a profile storage unit 284, a content storage unit 285, a video storage unit 286, a secure enclave 287, and/or a cache storage unit 288.

The memory 280 and any of its subunits described here may include any one or any combination of random access memory (RAM), read only memory (ROM), and various forms of secondary storage. RAM may be used to store volatile data and/or to store instructions that may be executed by the processor 260. For example, the data stored may be any one or a combination of a command, a current operating state of the server 200, an intended operating state of the server 200, and the like. As a further example, data stored in the memory 280 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage.

Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory 280 may include one or more databases for storing any data described here. Additionally or alternatively, one or more secondary databases located remotely from the server 200 may be utilized and/or accessed by the memory 280.

The operating system unit 281 may facilitate deployment, storage, access, execution, and/or utilization of an operating system utilized by the server 200 and/or any other computing environment described herein. In some embodiments, the operating system may include various hardware and/or software elements that serve as a structural framework for enabling the processor 260 to execute various operations. The operating system unit 281 may further store various pieces of information and/or data associated with operation of the operating system and/or the server 200 as a whole, such as a status of computing resources (e.g., processing power, memory availability, resource utilization, and/or the like), runtime information, modules to direct execution of operations described herein, user permissions, security credentials, and the like.

The application data unit 282 may facilitate deployment, storage, access, execution, and/or utilization of an application utilized by the server 200 or any other computing environment described herein (e.g., a user device). For example, users may be required to download, access, and/or otherwise utilize a software application on a user device such as a smartphone or other internet-enabled device in order for various operations described herein to be performed. As such, the application data unit 282 may store any information and/or data associated with the application which may allow the application and/or user device to perform methods associated with network communication disintermediation. As such, information included in the application data unit 282 may enable a user to execute various operations described here. The application data unit 282 may further store various pieces of information and/or data associated with operation of the application and/or the server 200 as a whole, such as a status of computing resources (e.g., processing power, memory availability, resource utilization, and/or the like), runtime information, modules to direct execution of operations described herein, user permissions, security credentials, and the like.

The application programming interface (API) unit 283 may facilitate deployment, storage, access, execution, and/or utilization of information associated with APIs of the server 200 and/or any other computing environment described herein (e.g., a user device). For example, server 200 may include one or more APIs for enabling various devices, applications, and/or computing environments to communicate with the server 200, multiple other servers, databases, or other user devices. Accordingly, the API unit 283 may include API databases containing information that may be accessed and/or utilized by applications and/or operating systems of other devices and/or computing environments associated with network communication disintermediation. An API may direct communications between the background component of the user device and the server 200. In some embodiments, each API database may be associated with a customized physical circuit included in the memory unit 280 and/or the API unit 283. Additionally, each API database may be public and/or private, and so authentication credentials may be required to access information in an API database.

The profile storage unit 284 may facilitate deployment, storage, access, and/or utilization of information associated with user profiles of users by the server 200 and any other computing environment described here (e.g., a user device). For example, the profile storage unit 200 may store one or more of a user's contact information, authentication credentials, user preferences, user history of behavior, personal information, search histories, purchasing histories, user ratings, and metadata. The profile storage unit 284 may store a user's images, searching histories, a user's location history as determined through the GPS subsystems of the user device, etc. In some embodiments, the profile storage unit 284 may communicate with the profile management unit 261 to receive and/or transmit information associated with a user's profile.

The content storage unit 285 may facilitate deployment, storage, access, and/or utilization of information associated with requested content by the server 200 and/or any other computing environment described here (e.g., a user device such as a mobile device). For example, the content storage unit 285 may store one or more of images, text, videos, audio content, advertisements, product lists, user recommendations, and metadata to be presented to a user during operations described herein. In some embodiments, the content storage unit 285 may communicate with the content management unit 262 to receive and/or transmit content files.

The media storage unit 286 may facilitate one or more of deployment, storage, access, analysis, and utilization of media content by the server 200 and any other computing environment described herein (e.g., a user device). Media content may be images, videos, audio files, and any other form of communicative media. For example, the media storage unit 286 may store one or more chat histories between a user and other users on the system 100. Further, the media storage unit 286 may store one or more searches, results, alerts, etc., generated by any unit or subunit of a server 200 or user device. Media content generated or used in performing any of the methods disclosed here may be stored in the media storage unit 286 so that the media content may be analyzed by various components of the server 200 both in real time and at a time after receipt of the media content. In some embodiments, the media storage unit 286 may communicate with the GPUs 264 to facilitate any of the processes described here. In some embodiments, media content may include audio, images, text, video feeds, and/or any other media content associated with methods and systems for network communication disintermediation.

The secure enclave 287 may facilitate secure storage of data. In some embodiments, the secure enclave 287 may include a partitioned portion of storage media included in the memory unit 280 that is protected by various security measures. For example, the secure enclave 287 may be hardware secured. In other embodiments, the secure enclave 287 may include one or more firewalls, encryption mechanisms, and/or other security-based protocols. Authentication credentials of a user may be required prior to providing the user access to data stored within the secure enclave 287. In some embodiments, the secure enclave 287 may store sensitive user information such as credit card data, sensitive personal data, and/or data associated with the location of a person throughout time.

The cache storage unit 288 may facilitate short-term deployment, storage, access, analysis, and/or utilization of data. In some embodiments, the cache storage unit 288 may serve as a short-term storage location for data so that the data stored in the cache storage unit 288 may be accessed quickly. In some embodiments, the cache storage unit 288 may include RAM and/or other storage media types that enable quick recall of stored data. The cache storage unit 288 may include a partitioned portion of storage media included in the memory 280.

The swapper interface settings 101, action bar settings 102, and toolkit settings 103 may be stored on any or all of the memory subunits, including subunits 281, 282, 283, 284, 285, 286, 287, and 288, of one or more servers.

The I/O unit 210 may include hardware and/or software elements for enabling the server 200 to receive, transmit, and/or present information. For example, elements of the I/O unit 200 may be used to receive user input from a user via a user device, present results, alerts, or compilation responses to the user via the user device, present suggested matches to the user via a user device, and the like. In this manner, the I/O unit 210 may enable the server 200 to interface with a human user in a manner such that the user may use the methods described here. As described, the I/O unit 210 may include subunits such as one of, or a combination of, an I/O device 211, an I/O calibration unit 212, and/or a media driver 213.

The I/O device 210 may facilitate any one or any combination of the receipt, transmission, processing, presentation, display, input, and output of information as a result of executed processes described here. In some embodiments, the I/O device 210 may include a plurality of I/O devices. In some embodiments, the I/O device 210 may include one or more elements of any one or a combination of a user device, a computing system, a server 200, and a similar device.

The I/O device 211 may include a variety of elements that enable a user to interface with the server 200. For example, the I/O device 211 may include a keyboard, a touchscreen, a button, a sensor, a biometric scanner, a laser, a microphone, a camera, an internet-enabled device, and/or another element for receiving and/or collecting input from a user. Additionally and/or alternatively, the I/O device 211 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 211 may communicate with one or more elements of the processor 260 and/or the memory unit 280 to execute operations described herein. For example, the I/O device 211 may include a display, which may utilize the GPU 264 to present media content stored in the media storage unit 286 to a user of a user device.

The I/O calibration unit 212 may facilitate the calibration of the I/O device 211. For example, the I/O calibration unit 212 may detect and/or determine one or more settings of the I/O device 211, and then adjust and/or modify settings so that the I/O device 211 may operate more efficiently. In some embodiments, the I/O calibration unit 212 may utilize a media driver 213 (or multiple media drivers) to calibrate the I/O device 211. The media driver 213 may be installed on a user device so that the user device may recognize and/or integrate with the I/O device 2114, thereby enabling media content to be displayed, received, generated, and the like. In some embodiments, the I/O device 211 may be calibrated by the I/O calibration unit 212 by based on information included in the media driver 213.

The communication center 215 may facilitate establishment, maintenance, monitoring, and/or termination of communications between the server 200 and other devices such as user devices, other computing environments, third party server systems, and the like. The communication center 215 may further enable communication between various elements (e.g., units and/or subunits) of the server 200 as needed. In some embodiments, the communication center 215 may include a network protocol unit 216, an API gateway 217, an encryption engine 218, and/or a communication device 219. The communication center 215 may include hardware and/or software elements.

The network protocol unit 216 may facilitate establishment, maintenance, and/or termination of a communication connection between the server 200 and another device (e.g. user device) by way of a network. For example, the network protocol unit 216 may detect and/or define a communication protocol required by a particular network and/or network type. Communication protocols utilized by the network protocol unit 348 may include Wi-Fi protocols, Li-Fi protocols, cellular data network protocols, Bluetooth® protocols, WiMAX protocols, Ethernet protocols, power line communication (PLC) protocols, and the like. In some embodiments, facilitation of communication between the server 200 and any other device, as well as any element internal to the server 200, may include transforming and/or translating data from being compatible with a first communication protocol to being compatible with a second communication protocol. In some embodiments, the network protocol unit 216 may determine and/or monitor an amount of data traffic to consequently determine which particular network protocol is to be used for establishing a connection with a user device, transmitting data, and/or performing other operations described herein.

The API gateway 217 may facilitate the enablement of other devices and/or computing environments to access the API unit 283 of the memory 280 of the server 200. For example, a user device may access the API unit 283 via the API gateway 217. In some embodiments, the API gateway 217 may be required to validate user credentials associated with a user of a user device prior to providing access to the API unit 283 to the user. The API gateway 217 may include instructions for enabling the server 200 to communicate with another device.

The encryption engine 218 may facilitate any one or any combination of translation, encryption, encoding, decryption, and decoding of information received, transmitted, and/or stored by the server 200. For example, the encryption engine 218 may encrypt data associated with a user's credit card information, etc. Using the encryption engine, each transmission of data may be encrypted, encoded, and/or translated for security reasons, and any received data may be encrypted, encoded, and/or translated prior to its processing and/or storage. In some embodiments, the encryption engine 218 may generate any one or combination of an encryption key, an encoding key, a translation key, and the like, which may be transmitted along with any data content.

The communication device 219 may include a variety of hardware and/or software specifically purposed to enable communication between the server 200 and another device (e.g. user device), as well as communication between elements of the server 200. In some embodiments, the communication device 219 may include one or more radio transceivers, chips, analog front end (AFE) units, antennas, processors, memory, other logic, and/or other components to implement communication protocols (wired or wireless) and related functionality for facilitating communication between the server 200 and any other device. Additionally and/or alternatively, the communication device 219 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

User Interfaces

In performing the operations shown in FIGS. 3-20, the example interfaces described herein may communicate with server 200 to access information either from the server or an external source. The example interfaces described herein may be implemented as part of the system described in FIG. 1. Moreover, actions initiated through the user interfaces described in FIGS. 3-20 may be carried out by the processor 260 using memory 280 or an external source. In addition, example user interfaces described in FIGS. 3-20 may use the communication resources of a separate server and/or computer system.

Swapper Interface

The swapper interface 300 is a sophisticated filter that allows a managing user to select which communicator hub and/or target communicator's content to display. The swapper interface at once narrows the view to the specific communicator hub and/or target communicator(s) that the managing user wants to work with, but also broadens the view in that within that communicator hub/target communicator selection, a broad range of pages and analyses related to those communicator hub/target communicator designation are readily available.

Figure 3:
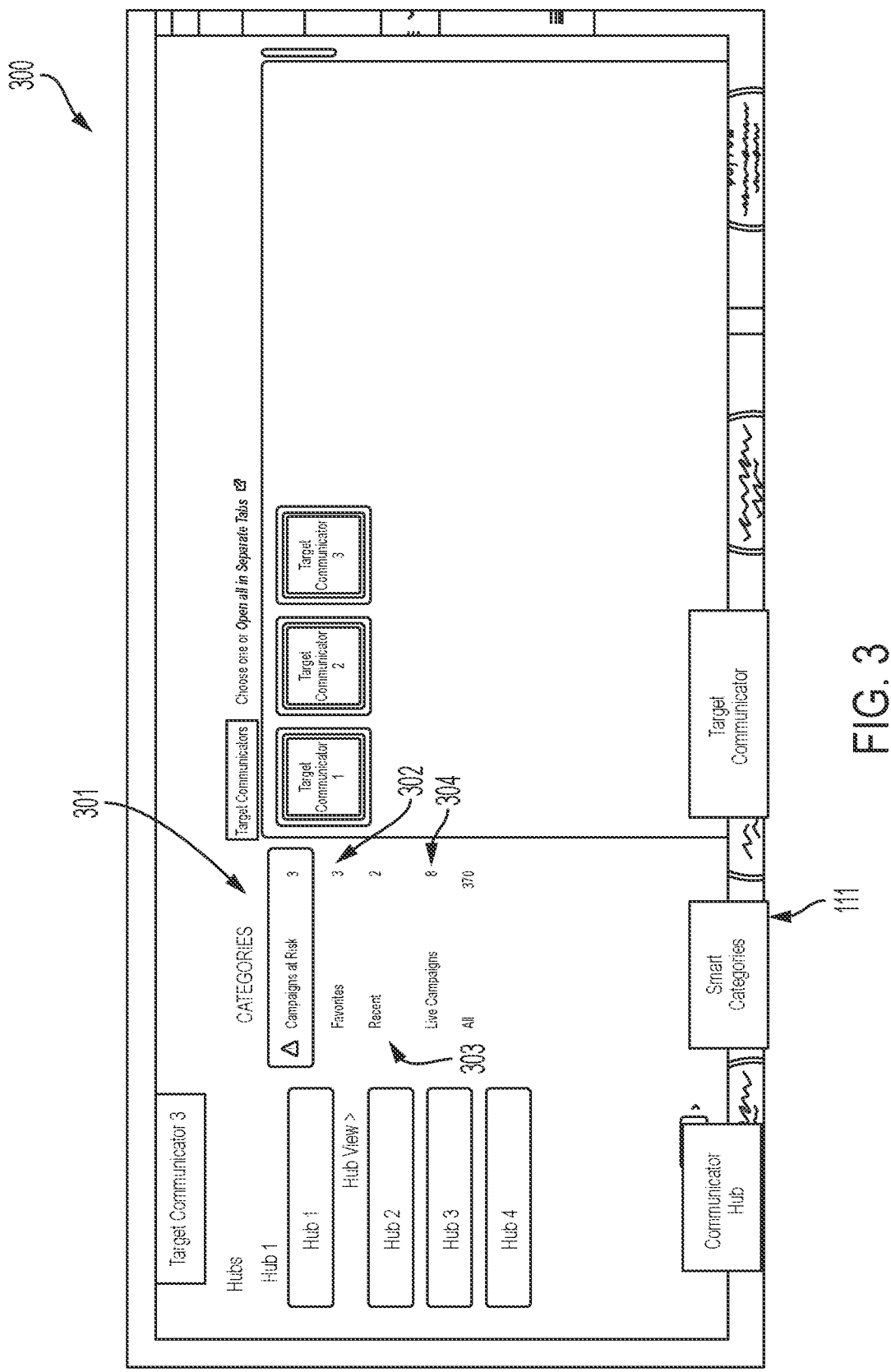
FIG. 3 shows an example interface for the swapper interface, according to one embodiment.

As shown in FIG. 3, in some embodiments, the swapper interface may be composed of three panes: a list of communicator hubs, from which the managing user can choose to swap the page to filter on the communicator hub of interest; lists of target communicators in user-directed or situationally-dependent smart categories 111, from which the managing user can choose to open a subset of a communicator hub's target communicators; and a list of target communicators, from which the managing user can choose to swap the page to filter on a specific communicator hub. When the managing user clicks on a communicator hub, a category may be auto-selected so that the managing user can immediately click on a target communicator. Managing user may select a communicator hub and target communicator to allow for seamless navigation through workflow.

As also shown in FIG. 3, in some embodiments, the target communicator groups allow the managing user to see or select from subgroups of target communicators. These user-directed or situationally-dependent smart categories 111 direct managing user to pages of particular interest. Some smart categories 111 may be based on user-directed preferences, such as favorites 302 or recently visited 303. Other categories may be based on situational grouping to help bring attention to pages of particular interest and to help manage and plan workflow. For example, one smart category 111 can provide a list of target communicators with campaigns that are forecasted to not meet their goals 301 or those with live campaigns 304. This brings attention to pages that managing user may want to prioritize.

The swapper interface allows a managing user to navigate between multiple target communicators without backtracking. Rather than having a managing user view a particular page for a particular target communicator and then navigate a vertical tree in order to view the same page for a different target communicator, the swapper interface allows for one-click navigation that bypasses the need for vertical navigation so that a managing user can go directly from viewing a particular page for a particular target communicator to the same page for a different target communicator. In some embodiments, a communicator hub and a target communicator may continue to be selected so that the managing user is not interrupted with navigation hierarchy traversal while moving between different tasks and switching between sections and pages in the sitemap. In some embodiments, the selected target communicator is prominently displayed so that the managing user knows which target communicator is selected at any given time.

In some embodiments and in some cases, some pages may not support the current managing user view selection. This may occur when the managing user opens a page and the swapper interface runs into a communicator hub or target communicator selection exception. For managing users with access to communicator hub- and target communicator-level views, switching from a page that shows target communicator-level details to a page that shows communicator hub-level details does not require extra navigation. The swapper interface may seamlessly and automatically swap from target communicator to communicator hub view to allow the managing user to view the desired page without consciously navigating away from the target communicator view. The automatic swapper interface function may also swap back from communicator hub view to target communicator view when managing user navigates to a page that is available for target communicator-level view In some embodiments, the swapper interface may be part of the sticky page header and cannot be hidden. In this embodiment, unless an exception has been made, the swapper may appear at the top of every page and may be consistently visible regardless of how far down a page the managing user scrolls. In other embodiments, the swapper interface scrolls to the current selection when opened. In yet other embodiments, any change in the swapper interface is animated. In some embodiments, an opened swapper interface is closed by selecting a different area of the page or by selecting ESC. In other embodiments, the swapper communicator hub and target communicator list support pagination.

In some embodiments, unless an exception has been made, the pages can be filtered to a single target communicator, or multiple target communicators under a single communicator hub. In some embodiments, controls and other objects necessary for the successful use of software is visibly accessible at all times and navigation is made visible.

In some embodiments, if the currently managing user's communicator hub list or target communicator list is very long, the current selection may not be on the first page of the results. In this case, the communicator hub or target communicator may be injected to the top of the paginated list and scroll-to-position of the amended list. Note that the injected communicator hub or target communicator may also appear in the page of the communicator hub or target communicator list.

In some embodiments, the communicator hub list shows communicator hubs the managing user has access to, grouped by the communicator hub group. The communicator hub list may be shown if the managing user has access to more than one communicator hub. In some embodiments, pages that have the ability to show content for target communicators the managing user has access to under a specific communicator hub may include inventory pages, reports, location, templates, home, and target communicator groups.

Figure 4:
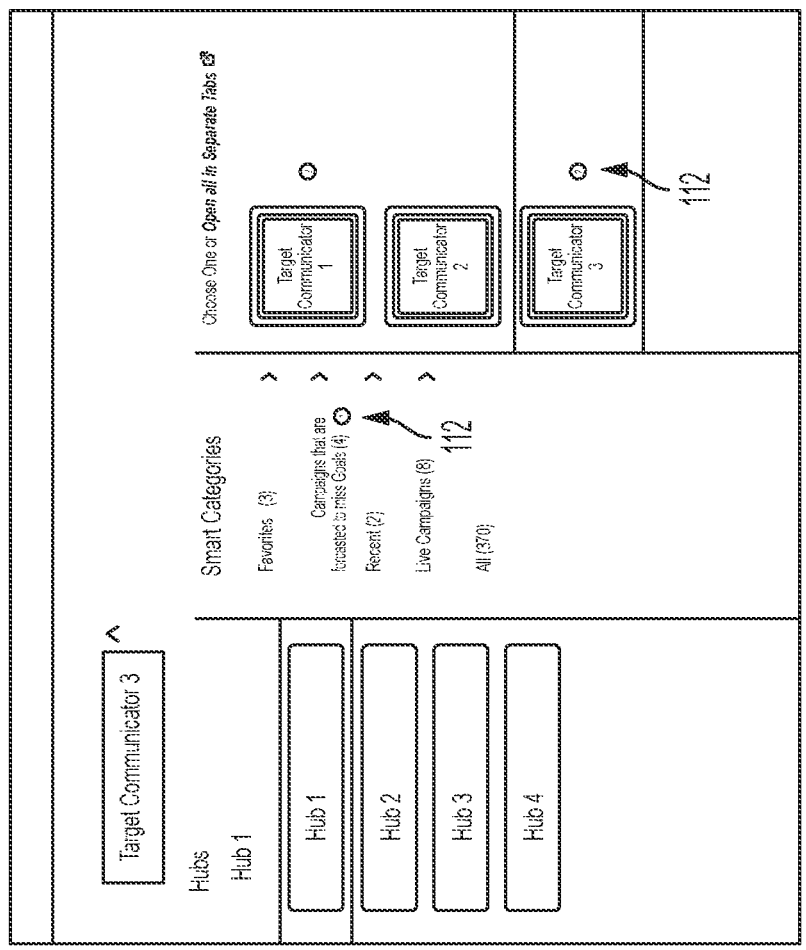
FIG. 4 shows an example interface for the swapper interface with alert badges, according to one embodiment.

As seen in FIG. 4, in some embodiments, badges 112 route the managing user's attention to communicator hubs, target communicator groups, and ultimately target communicators that may need to be prioritized, for example, those with campaigns that are forecasted to not meet their goals. A target communicator's badge 112 may show a total count of campaigns that are forecasted to not meet their goals. The target communicator groups and communicator hubs may be badged to show they contain badged target communicators.

In some embodiments, a universal search can return communicator hubs and target communicators as search results. Clicking a communicator hub in a universal search may return the most recently viewed target communicator for that communicator hub. If the communicator hub has no recently viewed target communicator, the search may fall back to the first favorite target communicator or the first target communicator in the all list. Selecting a target communicator in a universal search result may select the target communicator and a corresponding communicator hub in the swapper.

In some embodiments, if a user has a contextual tab open and swaps to a different target communicator, if the page supports autosaving, this may trigger autosaving. If the page has unsaved changes and the page includes an abandoned changes workflow, the page may show the unsaved changes popup.

Action Bar

The action bar 500 is a toolbar designed for faster, easier navigation, cross-referencing, and access to relevant interface buttons. The action bar showcases the richness of functionality on a page, making it easy to find and initiate platform features. In some embodiments, the action bar 500 appears on non-modal pages within the platform.

Figure 5:
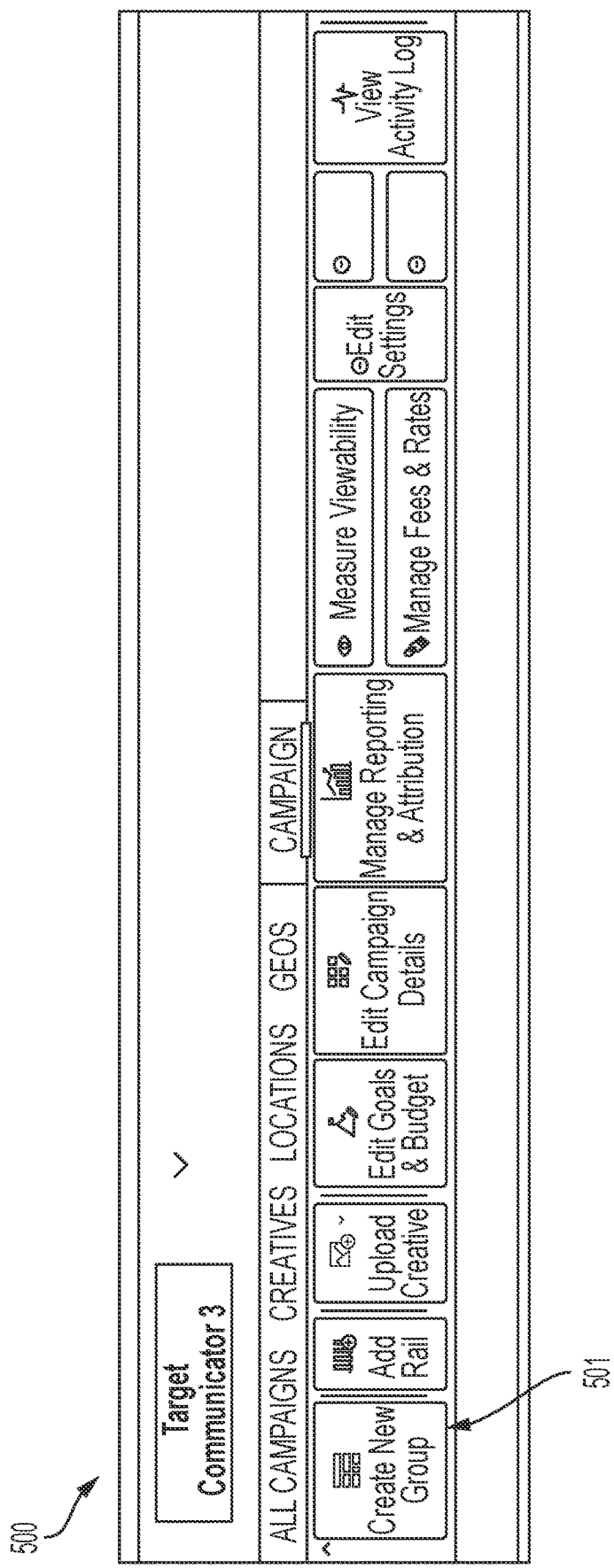
FIG. 5 shows an example interface for the action bar with action buttons, according to one embodiment.

As seen in FIG. 5, in some embodiments of the action bar 500, all or most interface buttons 501 are conveniently located in one area. Some of these interface buttons 501 may include "Create New Group," "Add Rail," "Upload Creative," "Edit Goals & Budget," "Edit Campaign Details," "Manage Reporting & Attribution," "Measure Viewability," "Manage Fees & Rates," "Edit Settings," and "View Activity Log." The action bar may attempt to fit all the page's buttons into the horizontal space afforded to it.

Figure 6A:
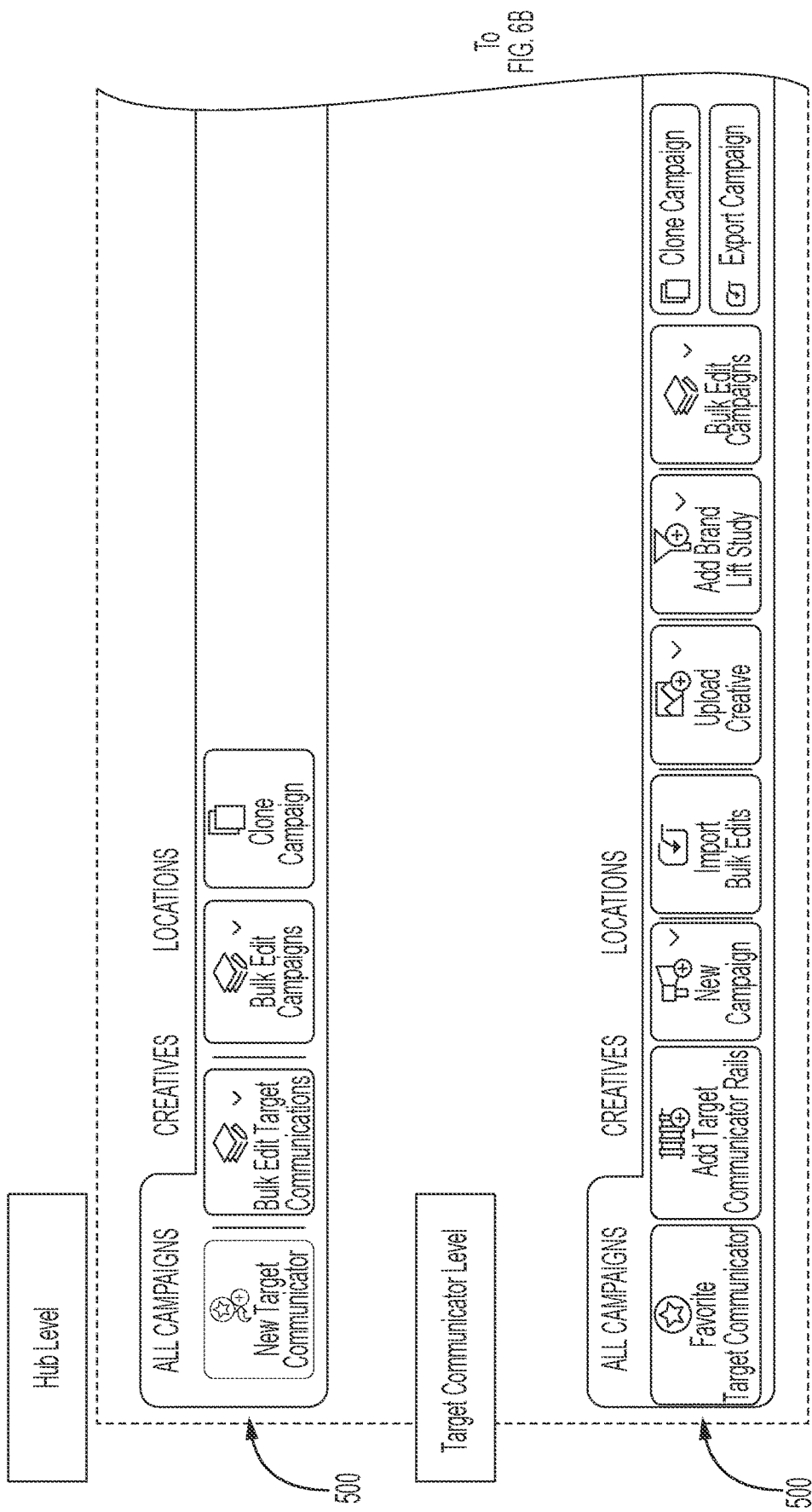
FIG. 6A shows the leftmost portion of an example of the differential button options available for communicator hub-level view as opposed to target communicator-level view, according to one embodiment.
Figure 6B:
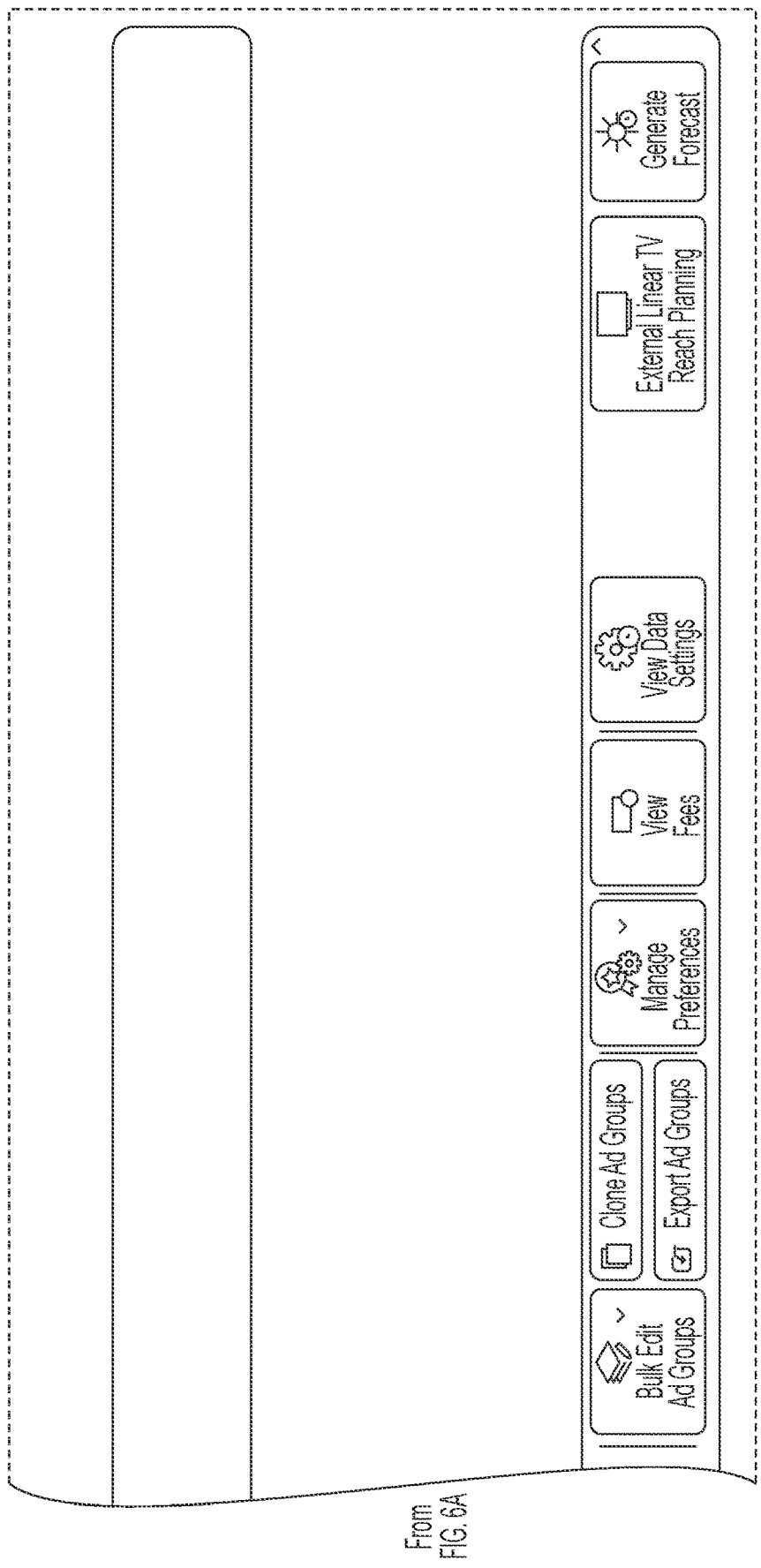
FIG. 6B shows the rightmost portion of an example of the differential button options available for communicator hub-level view as opposed to target communicator-level view, according to one embodiment.

As illustrated in FIGS. 6A and 6B, in some embodiments, interface buttons 501 appearing on the action bar 500 may be tailored to the page being viewed. These contextual buttons take into account the page being viewed and are tailored for relevance to that page and for importance to User. For example, the action bar 500 may contain a number of interface buttons 501. At the Hub level, these interface buttons may include "New Target Communicator," "Bulk Edit Target Communicators," "Bulk Edit Campaigns," and "Clone Campaign" buttons, while at the Target Communicator level, these buttons may instead be "Favorite Target Communicator," "Add Target Communicator Rails," "New Campaign," "Import Bulk Edits," "Upload Creative," "Add Brand Lift Study," "Bulk Edit Campaigns," "Clone Campaign," "Export Campaign," "Bulk Edit Ad Groups," "Clone Ad Groups," "Export Ad Groups," "Manage Preferences," "View Fees," "View Data Settings," "External Linear TV Reach Planning," and "Generate Forecast" buttons.

Figure 7:
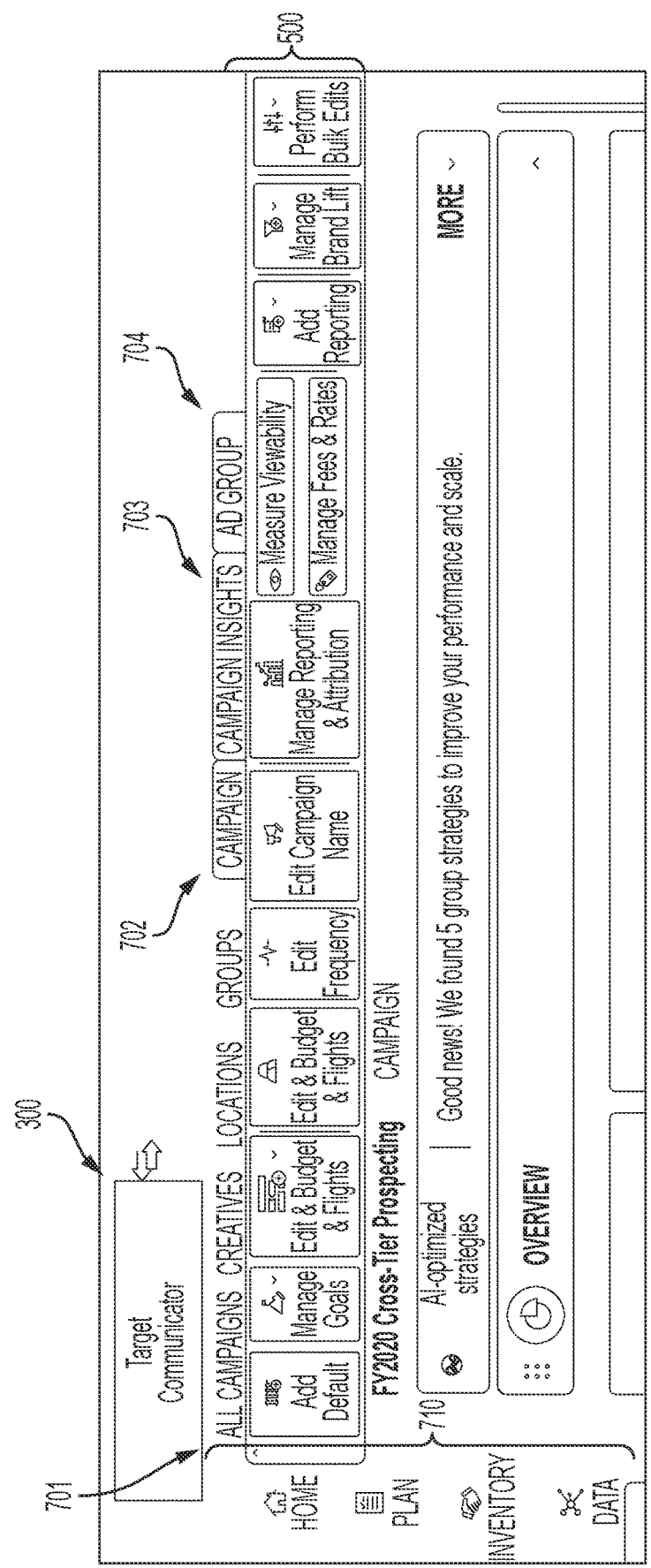
FIG. 7 shows an example interface for the action bar with examples of core tabs, contextual tabs, and contextual tab siblings, according to one embodiment.

As shown in FIG. 7, in some embodiments, the action bar may also show a navigation panel 710 providing access to sections of interest, such as "Home," "Plan," "Inventory," and "Data," and to core tabs 701. Contextual tabs 702 may be offered upon selection of core tabs. Contextual tabs 702 obviate the need to engage in excessive navigation by providing relevant tabs based on user input and remembering those tabs for easier horizontal navigation and cross-referencing. These tabs may be present based on what has been selected, giving easy access to relevant pages. Choosing a particular page may automatically populate related tabs that may be of interest to User while viewing the chosen page. Having the contextual tabs 702 allows the managing user to easily navigate without having to backtrack, improving the cross reference interface. Rather than having to navigate vertically, contextual tabs 702 allow the managing user to come back to recently used pages without consciously creating new tabs. This is particularly useful for managing users who cross-reference frequently and need to cycle through several pages repeatedly.

FIG. 7 also shows that in some embodiments, core tabs 701 are used to house the first level of navigation within a platform section. As shown in FIG. 7, core tabs 701 may include all "All Campaigns," "Creatives," "Locations," and "Groups." Unlike contextual tabs 702, core tabs 701 may be consistently visible to the managing user. Core tabs 701 may be used to store the dashboards, list views, and information hubs that correspond to a starting point to discrete managing user workflows. Platform sections that have core tabs 701 may have a distinct set of core tabs 701, but not every platform section may have core tabs 701. A core tab 702 may appear in one section of the platform. Core tab titles may support localization. Core tabs 701 may be tied to roles and permissions. Some managing users may have a subset of core tabs 701 available to them. The set of core tabs 701 displayed within a platform section may not change. Navigating between a section's core 701 or contextual 702 tabs might not introduce or remove any core tabs 701. When the managing user navigates to a platform section, the first core tab 701 may be automatically selected. Core tabs 701 can have the following states: Selected, on hover, or not selected.

As FIG. 7 further illustrates, in some embodiments, contextual tabs 702 are used to house the detail pages for existing objects, enabling managing users to review an object's state and modify its configuration. Contextual tabs 702 reduce the friction of navigating the breadth of the platform by flattening an otherwise deeply nested page hierarchy. In some embodiments, contextual tabs 702 can open contextual tab siblings 703. Contextual tab siblings 703 contain insights that can be easily cross-referenced by toggling between the object details and the object insights. For example, as shown in FIG. 7, a contextual tab may be a "Campaign" tab, that could, in turn, open a related "Campaign Insights" contextual tab sibling. Contextual tab siblings 703 may be optional and may be used by a minority of contextual tabs 702. In other embodiments, contextual tabs 702 may open child contextual tabs 704. Detail pages that themselves include an object list, such as a campaign which lists groups, may open up a child contextual tab 704 to display the child object's details. In some embodiments, child contextual tabs 704 may not open their own child contextual tabs 704.

In some embodiments, contextual tabs 702 remain open in each section throughout a managing user's session so that the managing user can quickly get back to their most recently opened objects. Some embodiments keep scroll positions when the managing user switches back and forth between tabs in a contextual tab set. Some embodiments allow the managing user to switch between platform sections and pages in a contextual tab set without a refresh. Some embodiments return the managing user to their most recently opened tab instead of the section landing page tab when switching between platform sections. In some embodiments, only one set of contextual tabs 702 can be opened in each platform section at a time. A contextual tab set is the group of contextual tabs 702, contextual tab siblings 703, and child contextual tabs that are related to one object. If the managing user selects on an object that will open a contextual tab set, the action bar may close and replace any contextual tab set that is already opened in the platform section. When a contextual tab 702 is selected by selecting a button or object in a core tab 701, the contextual tab 702 may be automatically selected and its parent core tab 701 deselected. A child contextual tab 704 may be opened by selecting a button or object in a contextual tab 702. The child contextual tab 704 may be automatically selected and the parent contextual tab 702 deselected. If a contextual tab 702 is associated with a sibling insights tab, the contextual tab sibling 703 may be automatically opened when the contextual tab 702 is opened.

In some embodiments, a contextual tab set may remain opened for the duration of a managing user's session so that the managing user can easily get back to their most recently viewed object, especially when their workflow takes them across multiple platform sections. contextual tabs 702 may remain open even when the managing user switches between core tabs 701 in the same platform section or switches between platform sections in the navigation panel 710.

In some embodiments, contextual tabs 702 cannot be manually closed, but are automatically closed when a managing user opens a new contextual tab 702 at the same level in the hierarchy; opens a new contextual tab 702 within the one section, thereby closing and replacing the opened contextual tab 702, its children 704, and its siblings 703; or opens up a new child contextual tab 704, thereby closing and replacing the opened child contextual tab 704 and sibling 703.

In some embodiments, the swapper interface 300 selection can be changed through manual managing user manipulation by going to a URL or opening up the swapper. Auto-swapping may not close contextual tabs 702. If the swapper is automatically changed when navigating away to another section of the navigation panel 710, the contextual tabs 702 for one section might not close when a second section is opened, even if there is a page exception and the swapper auto-swaps to the communicator hub. When the managing user returns to the first section and the swapper auto-swaps to the previously selected target communicator, the previous contextual tabs 702 may still be relevant.

If the browser window is too small to show all core 701 and contextual 702 tabs in a section, the core tabs 701 may be collapsed into an overflow pattern, but in many embodiments, the contextual tabs 702 are not collapsed. In an extreme scenario, all core tabs 701 may be collapsed, and the contextual tabs 702 may force the page frame to scroll horizontally. In some embodiments, the action bar options associated with a contextual tab may be distinct from those of its parent, child, or sibling tabs. The contextual tab name may be a link. The managing user may be able to click the link to copy it or open it up in a new browser window or tab.

Figure 8:
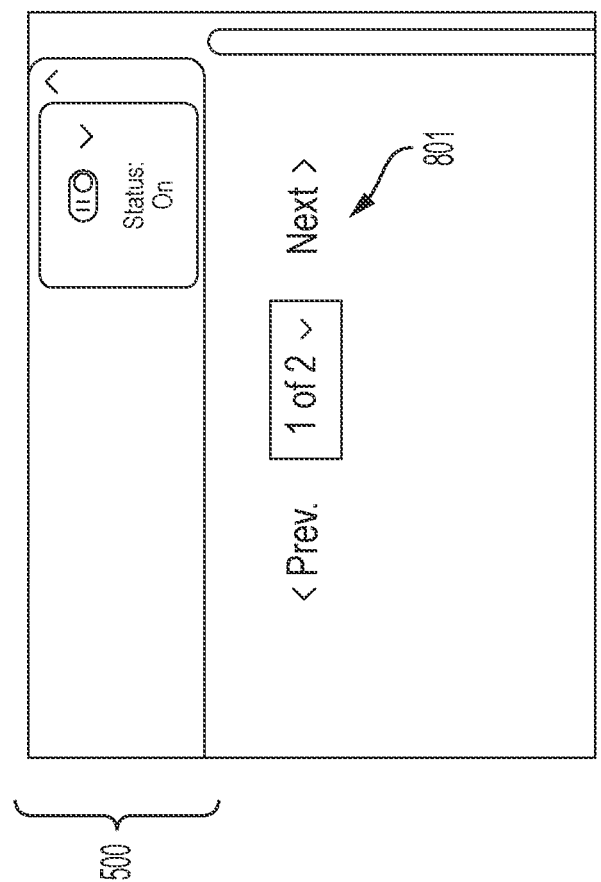
FIG. 8 shows an example of horizontal navigation within tabs, according to one embodiment.

As illustrated in FIG. 8, navigation within tabs allows the managing user to cycle through pages without opening multiple tabs. Rather than opening multiple tabs, the managing user may use horizontal navigation buttons 801 such as "Next" and "Prev." within the tabs to navigate horizontally through relevant pages.

In some embodiments, badges 112 may appear on buttons. Badges 112 may be added to the buttons to alert the managing user of tabs or actions that need attention based on situational parameters. These badges may include "New" for a new feature, "Beta" for a beta feature, and "AI" for a button associated with an Artificial Intelligence-based "AI" recommendation. This AI recommendation is based on data analysis of audience activity as illustrated in FIG. 1 and uses data fluctuations and user-directed campaign adjustments over time to provide recommendations intended to optimize campaigns and improve performance.

Figure 9:
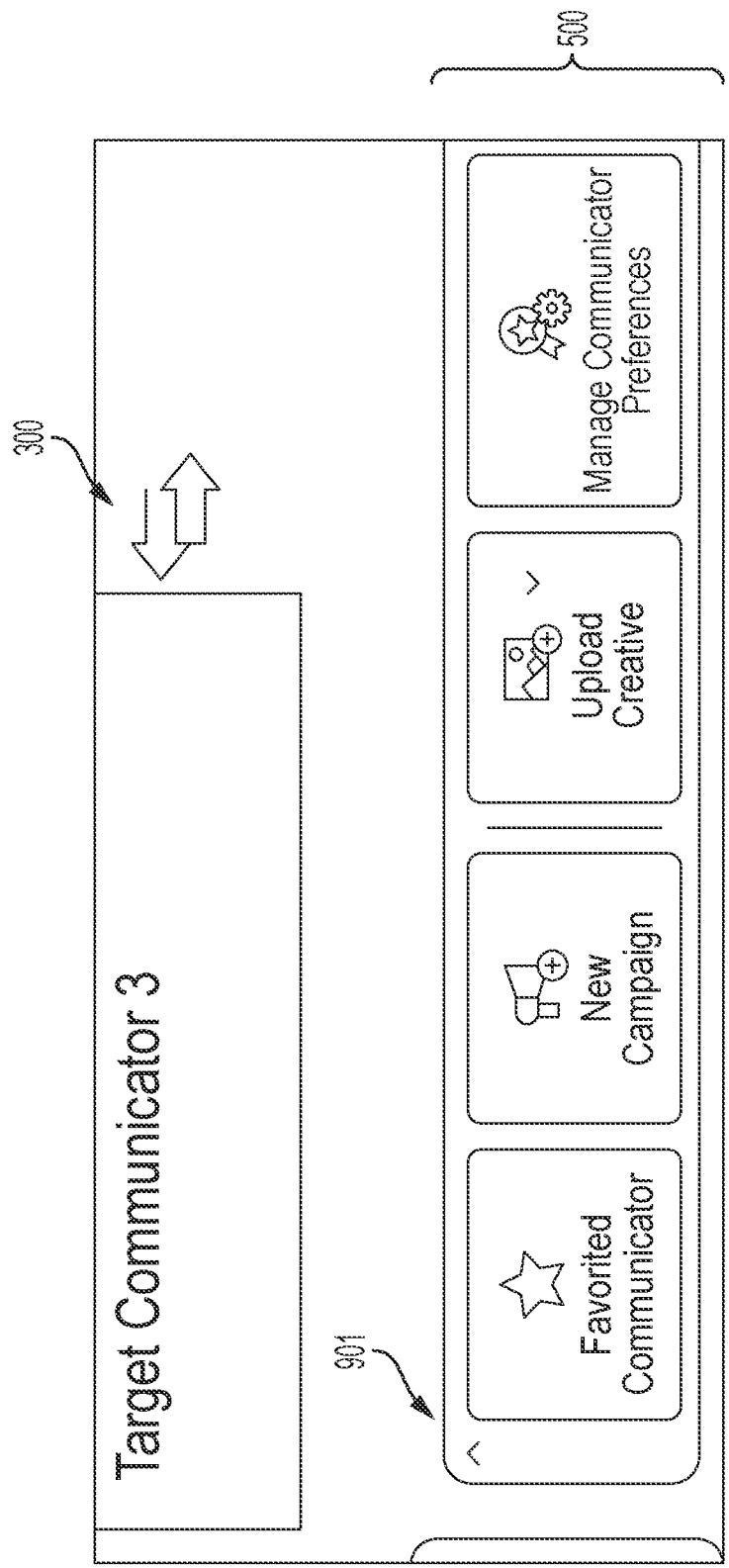
FIG. 9 shows an example of a minimization chevron for the action bar interface, according to one embodiment.

As illustrated in FIG. 9, in some embodiments, the action bar may be expanded and collapsed through the use of a minimization chevron 901. The action bar may be collapsed when not needed so the managing user can view expand the field of view of the page and not be distracted. In some embodiments, if the managing user collapses the action bar, the action bar may remain collapsed as the managing user switches pages for the duration of the managing user's session. When the managing user starts a new session, the action bar may return to its expanded default state. In some embodiments, pinned buttons are never collapsed. If, even after button groups are collapsed, there is not enough space to display all the buttons, button groups and stand-alone buttons may be collapsed into an overflow "More" drop down button in reverse rank order. Stand-alone buttons may be collapsed into menu items. Button groups may be flattened into menu items with a button group label identifying the group.

In some embodiments, every feature and system action that the page supports has a corresponding button within the action bar. For example, action bar buttons may initiate edits, launch campaigns, open modes, and navigate to new pages. Buttons may also favorite or unfavorite a target communicator selected in the swapper interface. The interface may show visual feedback on whether the target communicator is a favorite.

In some embodiments, actions may launch discrete, focused experiences. Instead of launching a sequence of dialog boxes that lead the user through a series of well-defined steps or "wizard," they may launch an experience that could be a small part of a wizard, comprising limited steps. In some edge case scenarios, some modes and features may be initiated with inline page elements. Examples may include doing an inline search on a table, changing table filters, or opening a visualization's detail mode where a forecast may be modified.

In some embodiments, the order, grouping and sizing of the action bar buttons are intentional. Buttons that work together may be grouped together. Buttons that are more important may be larger. Buttons that are more important (by frequency of usage or how much adoption should be driven) may be closer to the one side of the action bar.

In various possible embodiments, button states may be active, on hover, on press, or disabled. Disabled buttons may look active, but show a disabled message on click that shows what the managing user has to do to make the button active. Button types may include simple button, toggle, and drop down. Button sizes may include large and small. In some embodiments, buttons may be pinned to the right-hand side of the action bar. These buttons may include status toggles, activity log, inventory pins, and plan pins. A button may consist of an image, label, tooltip, and action.

In some embodiments, no more than one action bar may appear per page. In other embodiments, action bars may be consistently visible as part of a sticky platform header. In some embodiments, unless it is specified otherwise, actions that initiate edits, open contextual tabs, or open modals are initiated through the action bar.

In some embodiments, each page declares all its available buttons to the action bar on page load. In this embodiment, the list of buttons should not expand or decrease based on the managing user's interaction with the pages content. All features may be discoverable through the action bar. Moving between pages refreshes the action bar with buttons relevant to that page.

In other embodiments, the action bar only displays the buttons associated with features the managing user has permission to use while the other buttons are hidden. Action bar buttons may also obey the managing user's roles and permissions. Read only pages may not have an action bar. Inactive buttons may remain inactive until content is selected.

In yet another embodiment, if all action bar buttons and groups are hidden, the action bar is completely hidden from the managing user. This can occur in some scenarios where the managing user only has read-only permissions. If all buttons in a button group are hidden, the button group is hidden as well.

In some embodiments, if a simple button or toggle is associated with an AI-based recommendation, it may be transformed into a drop-down button. The drop down lists menu items describing the AI recommendations followed by a menu item to initiate the button's original functionality. Menu buttons with AI recommendations may have items added to the top of the menu describing the AI recommendations. Clicking the AI recommendation menu item opens the AI modal where the recommendation can be understood and applied.

Toolkit

The toolkit allows a managing user to seamlessly navigate horizontally and perform the same tasks for different clients. FIGS. 10-20 depict the toolkit on the right side of the interface, but this in no way limits the location of the toolkit. The toolkit may be located in any position.

Figure 10B:
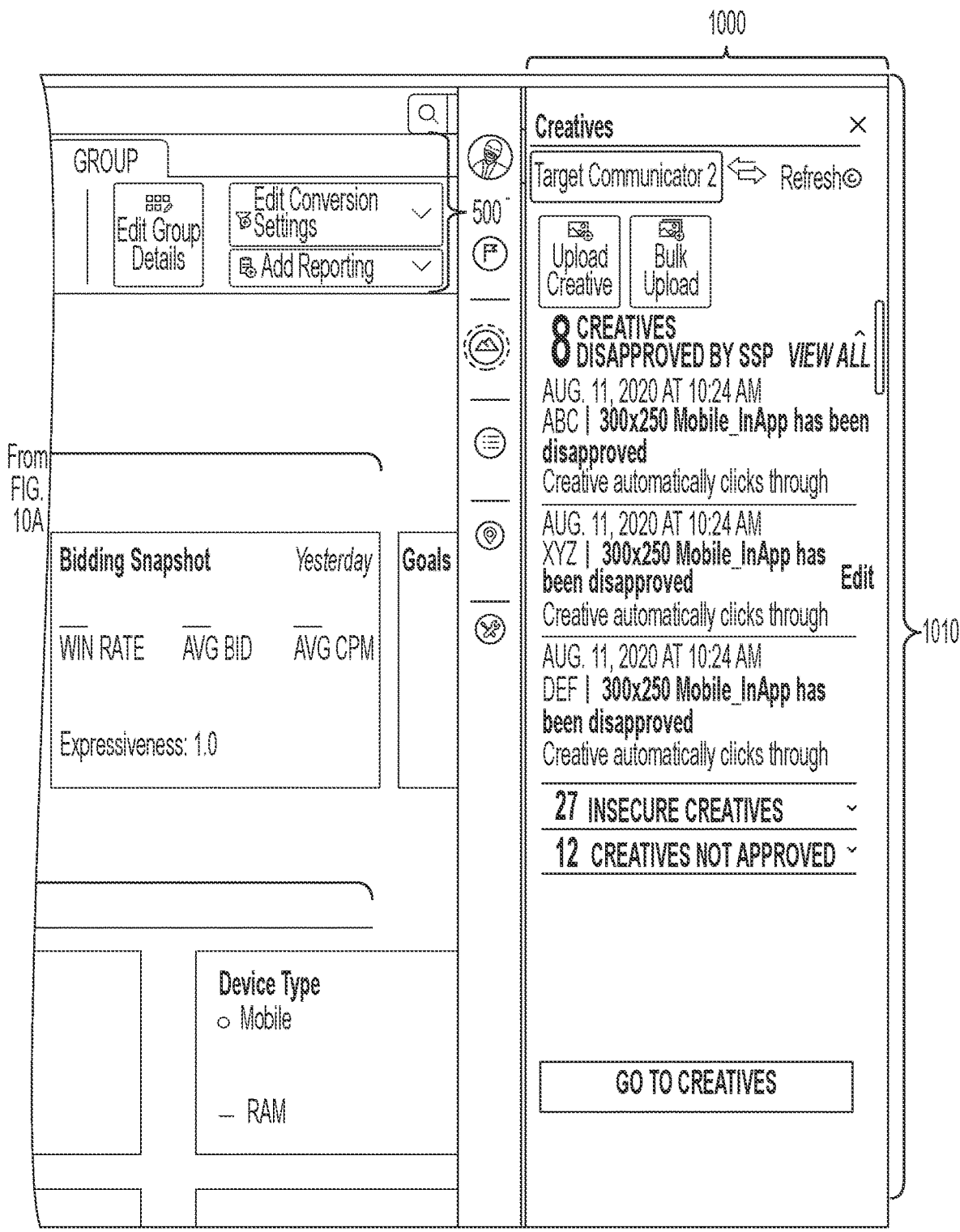
FIG. 10B shows the rightmost portion of an example of a creatives toolkit, according to one embodiment.

As illustrated in FIGS. 10A and 10B, in some embodiments, the toolkit 1000 may contain a creative toolkit 1010 that provides an organized and navigable overview of a creative library that contains target communicator creative assets. These creative assets consist of the parts that make up a targeted communication, including, but not limited to images, text, and other media. Without having to navigate to multiple pages, the managing user is able to see an overview of the status of target communicator creative assets and interact with the assets through action buttons in the toolkit 1000. The main user interface, containing the swapper 300 and action bar 500, including the navigation panel 710, may remain visible when the toolkit 1000 is active. In some embodiments, a managing user may view information for multiple target communicators in the toolkit 1000 without navigating away from the current target communicator on the main page. In some embodiments, the toolkit 1000 is uncoupled from the main user interface, allowing the managing user to multitask and/or monitor the toolkit 1000 information for one target communicator while working on the campaign of another. For example, FIGS. 10A and 10B shows the swapper setting of the main user interface set to "target communicator 3" with user-directed and situation-dependent smart categories 111, optimization rails 1020, and targeting rails 1030 all directed to information for target communicator 3. The optimization rails 1020 include data analysis information for target communicator 3 such as "Recommendations," "Activity," "Bidding Snapshot," and "Goals." Targeting rails 1030 include information for target communicator 3 such as "Environment," "Audience," "Creatives," and "Device Type." In contrast, the creative toolkit 1010 is directed toward target communicator 2.

Figure 11:
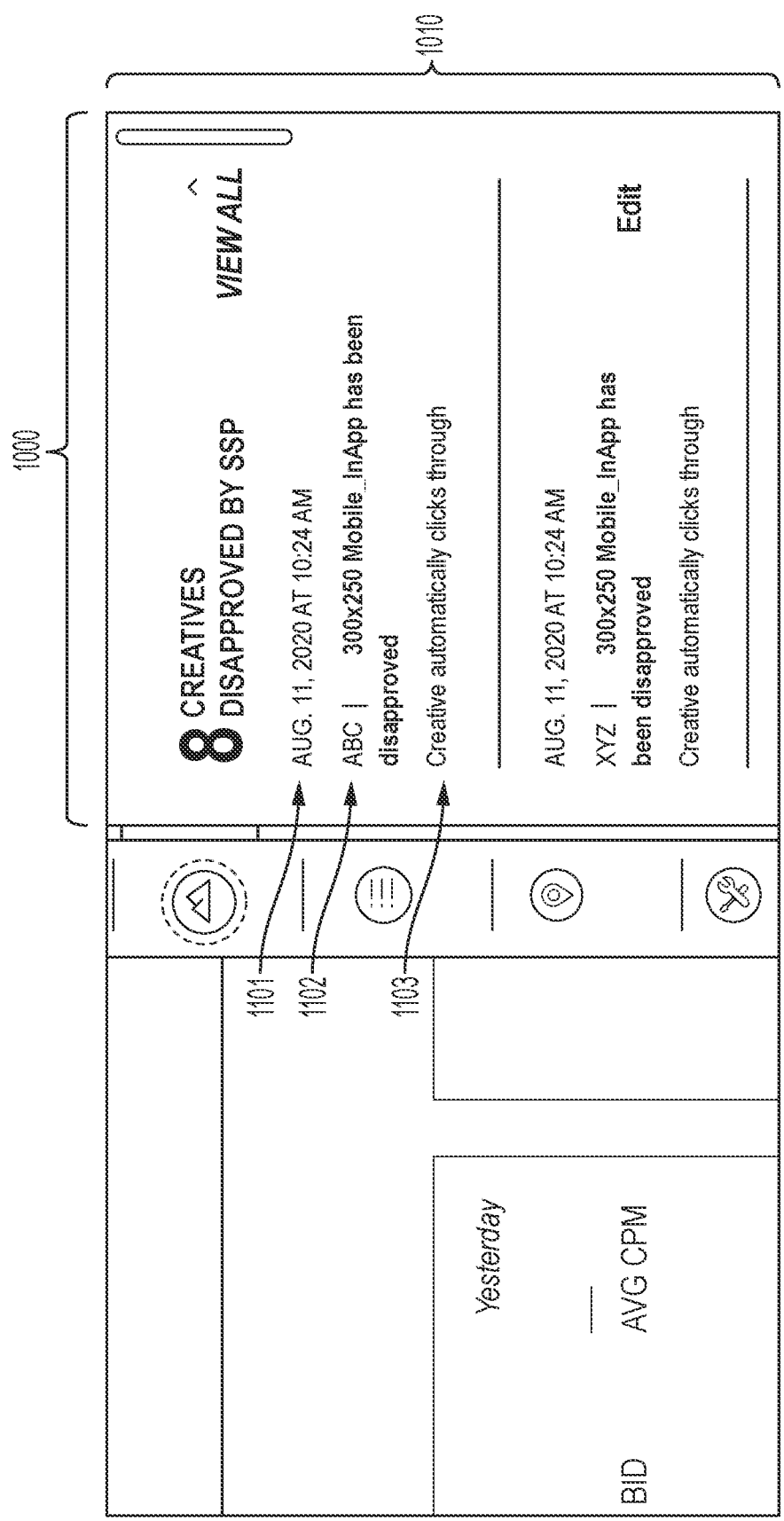
FIG. 11 shows an example of an informational panel associated with a creative toolkit, according to one embodiment.

As shown in FIG. 11, in some embodiments of the toolkit 1000, an information panel 113 may allow for a managing user to identify problems and prioritize workflow. These alerts provide details such as the date of alert 1101, the name of the creative asset 1102, and an explanation of why the alert was issued 1103. In the case of the creative toolkit 1010, the information panel 113 may allow the managing user to identify incomplete creative assets. Alerts not only allow managing users to quickly identify problems, but also provide a simple and easy-to-read summary of the problems so that the managing user can quickly assess the situation and manage workflow accordingly.

Figure 12A:
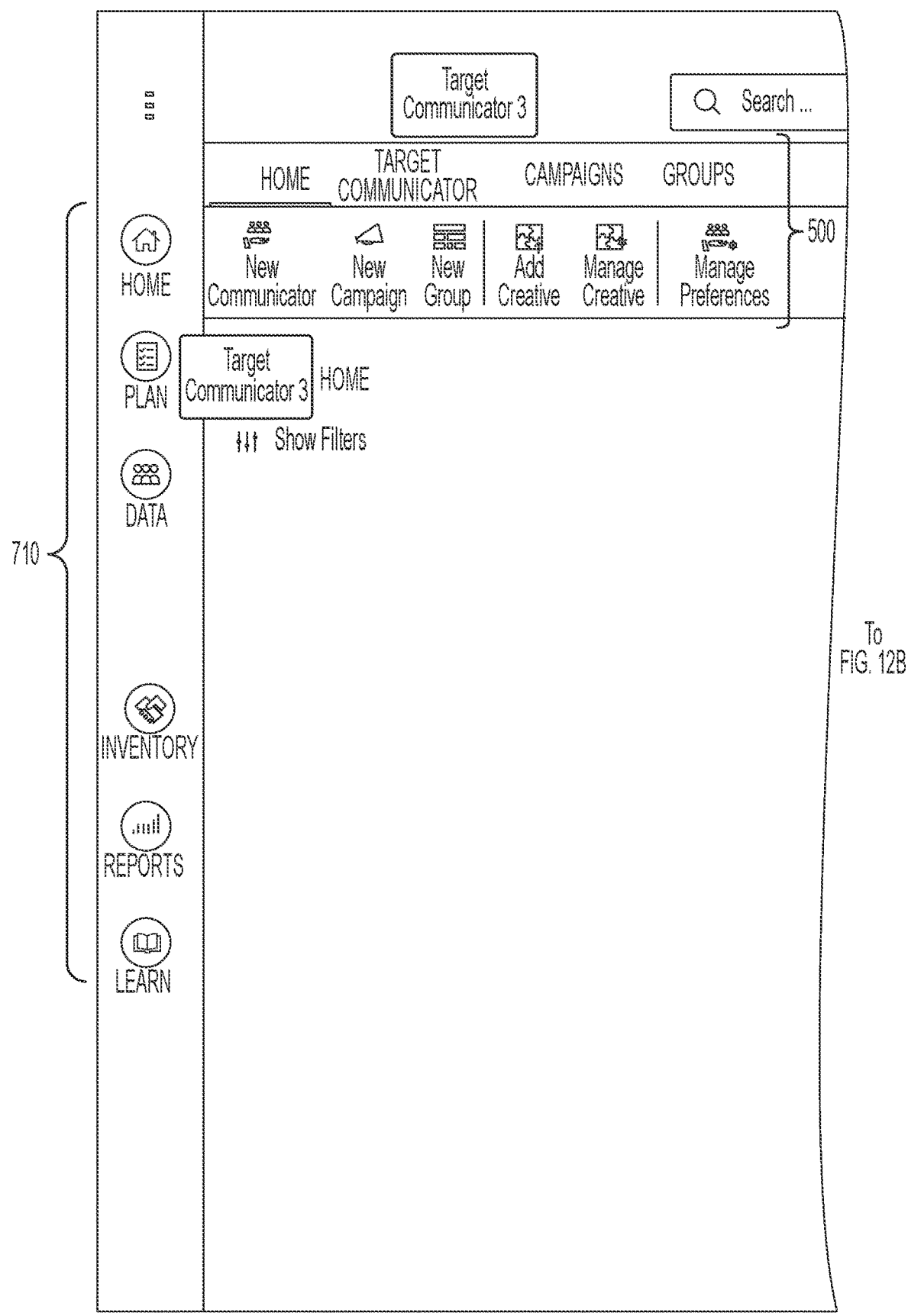
FIG. 12A shows the leftmost portion of an example of an alerts and notification toolkit, according to one embodiment.
Figure 12B:
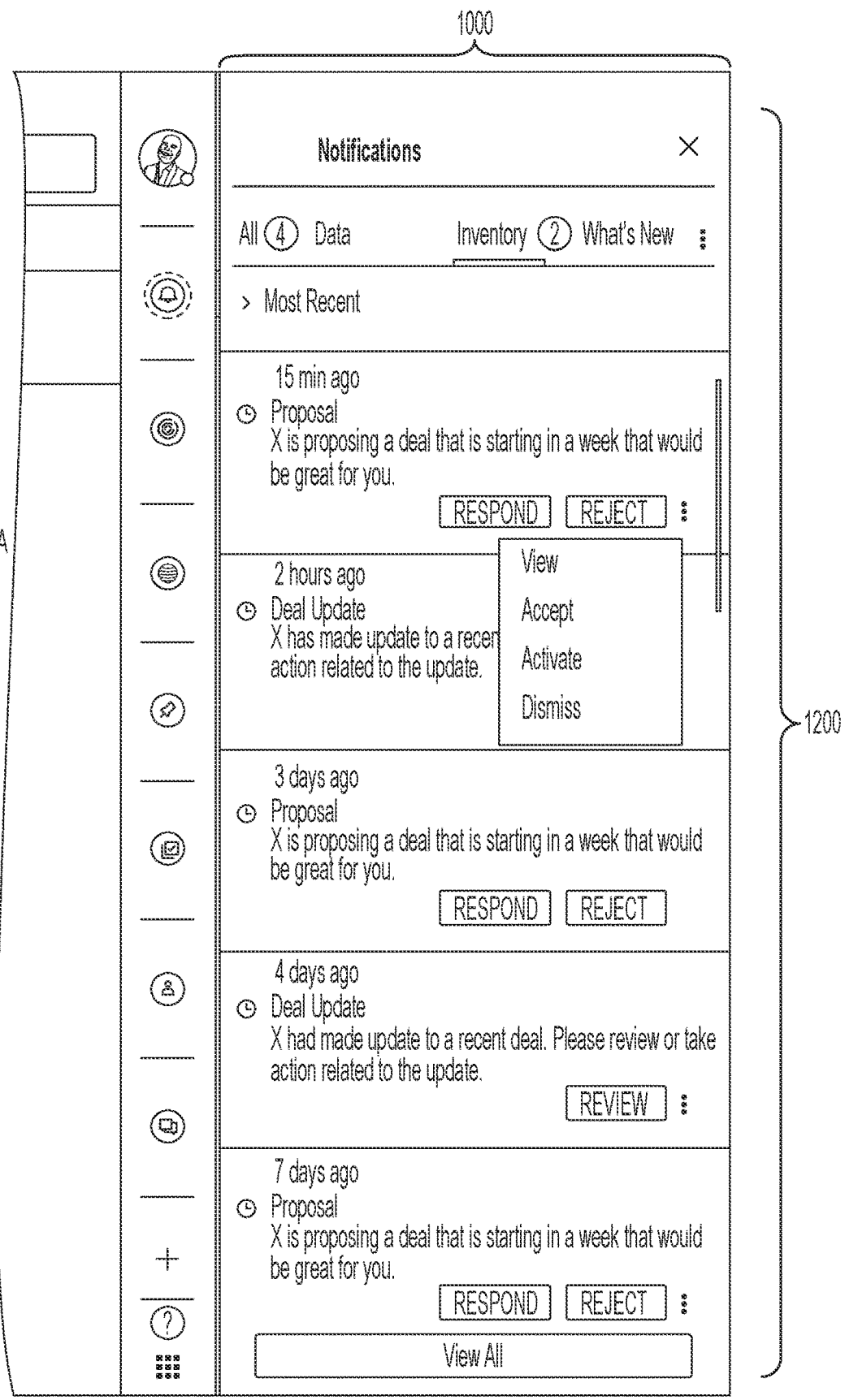
FIG. 12B shows the rightmost portion of an example of an alerts and notification toolkit, according to one embodiment.

As shown in FIGS. 12A and 12B, in some embodiments, the toolkit 1000 may contain an alerts and notifications toolkit 1200 that may provide recommendations for improving campaign scale or performance. In some embodiments, the alerts and notifications may be distributed throughout the platform where relevant. In some embodiments, the alerts and notifications can be triggered by an event. In some embodiments, the alerts and notifications can be computed in batches. In some embodiments, the alerts and notifications toolkit provides this additional information tailored to the currently selected target communicator, to the currently selected hub, or to everything that the user has access to. Similar to FIGS. 10A and 10B, the main user interface, including the action bar 500, complete with navigation panel 710, may be visible. Also as in FIGS. 10A and 10B, in some embodiments, a managing user may view information for multiple target communicators in the toolkit 1000 without navigating away from the information on the main page.

Figure 13A:
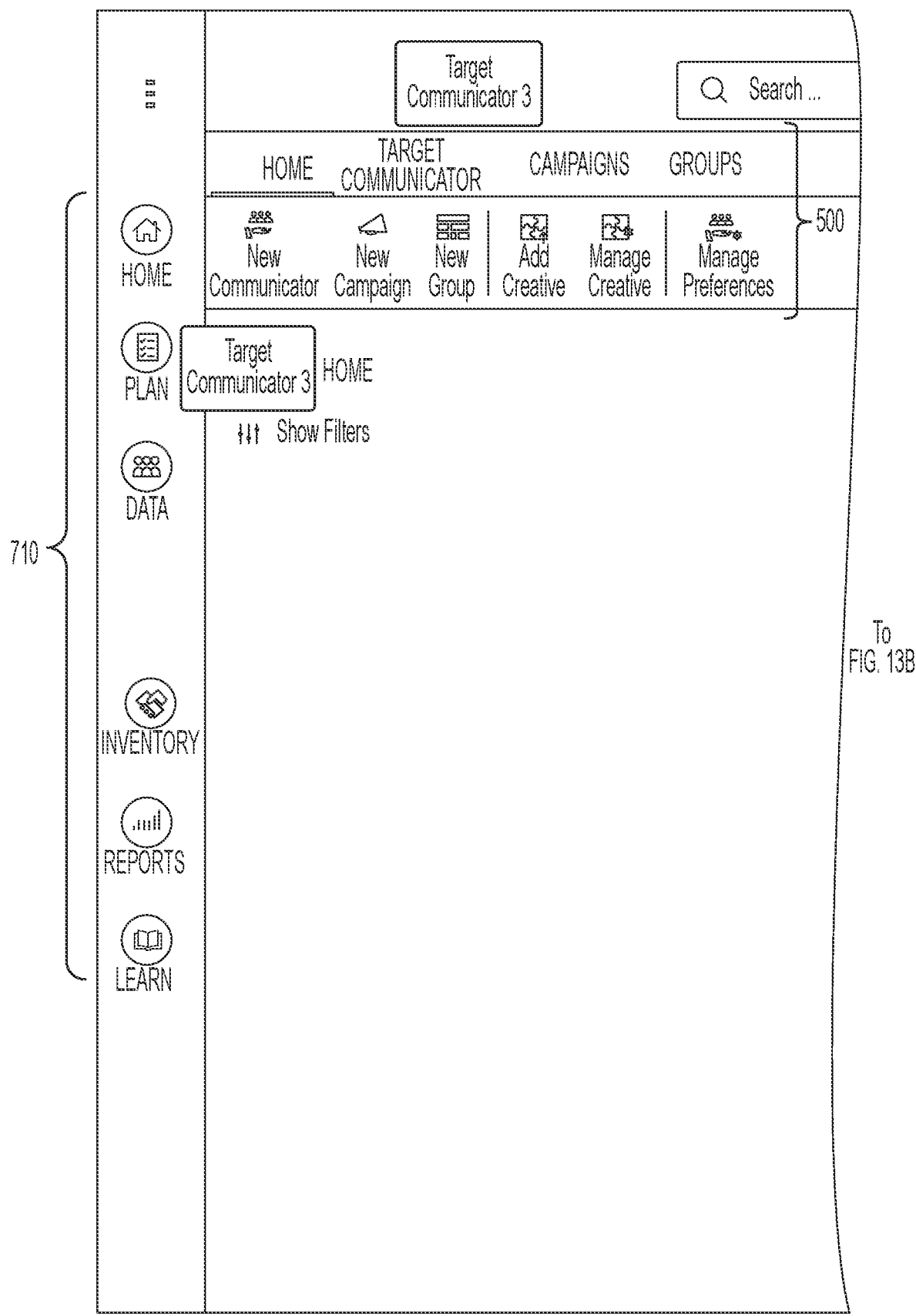
FIG. 13A shows the leftmost portion of an example of a health and recommendation toolkit, according to one embodiment.
Figure 13B:
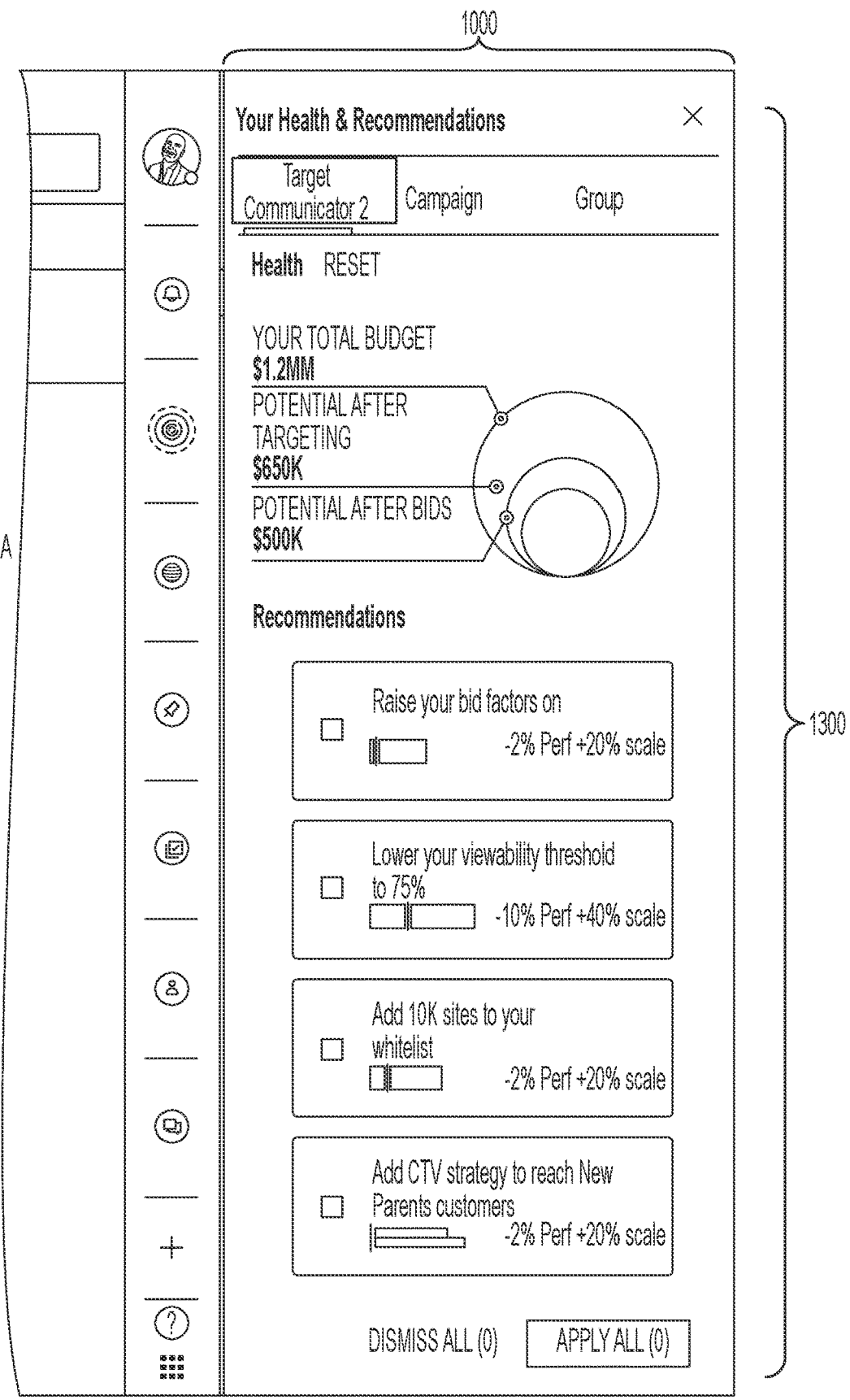
FIG. 13B shows the rightmost portion of an example of a health and recommendation toolkit, according to one embodiment.

As shown in FIGS. 13A and 13B, in some embodiments, the toolkit 1000 may contain an account health toolkit 1300 that gives insight into the overall health of the targeted communications at the target communicator or hub level. In some embodiments, the account health toolkit provides information as to how targeted communications and campaigns are performing in aggregate as compared to historic performance and expected performance. In some embodiments, the account health toolkit may offer recommendations for positively affecting performance. In some embodiments, the account health toolkit provides this additional information tailored to the currently selected target communicator or to the currently selected hub. As in FIG. 12, the main user interface, including the action bar 500, complete with navigation panel 710, may be visible. Also as in FIG. 12, in some embodiments, a managing user may view information for multiple target communicators in the toolkit 1000 without navigating away from the main page, as shown by the main user interface being directed to target communicator 3, while the account health toolkit 1300 is directed to target communicator 2.

Figure 14A:
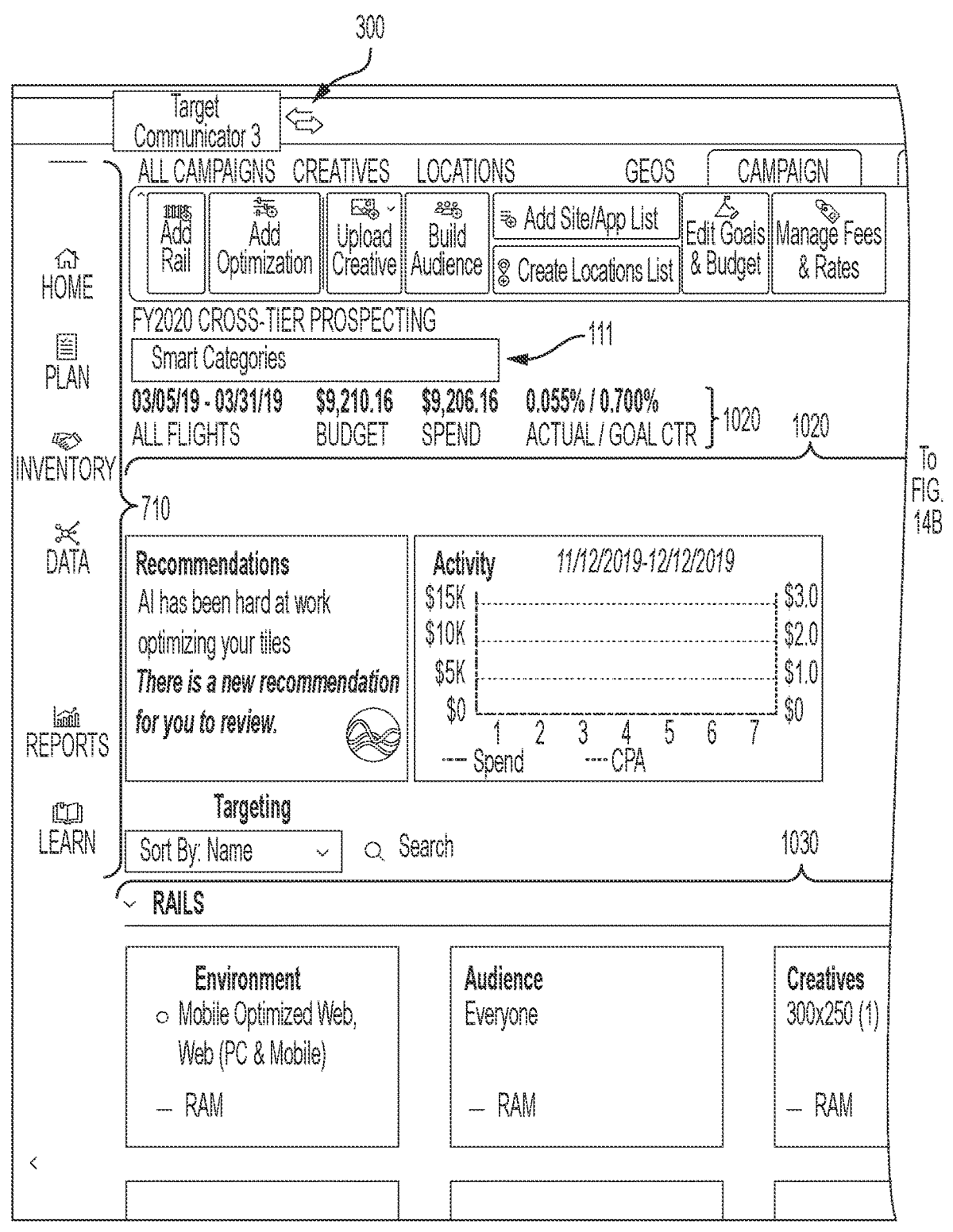
Figure 14B:
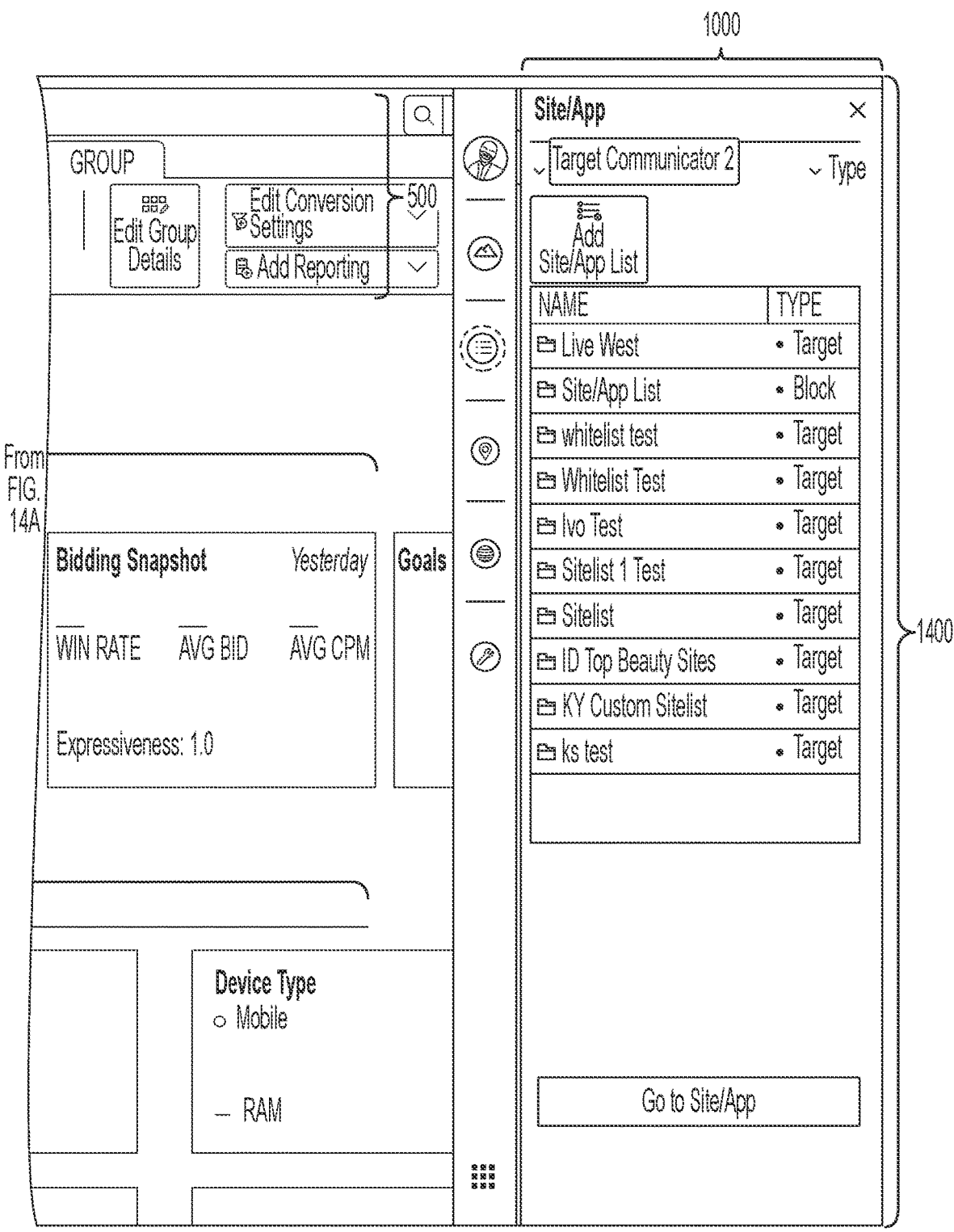
FIG. 14B shows the rightmost portion of an example of a site/app toolkit, according to one embodiment.

As shown in FIGS. 14A and 14B, in some embodiments, the toolkit 1000 may contain a site/app toolkit 1400 that gives the user a list of websites and applications on which a campaign should or should not be run. In some embodiments, the site/app toolkit highlights lists of frequently used and currently used website and applications and provides context on how these lists affect campaign performance. In some embodiments, the site/app toolkit highlights lists of websites and applications that may improve campaign performance. In some embodiments, the site/app toolkit allows the user to drag and drop a list of websites and applications into a new or existing campaign to quickly add the list to the campaign targeting rails. In some embodiments, the site/app toolkit provides this additional information tailored to the currently selected target communicator or to the currently selected hub. As in FIGS. 10A and 10B, in some embodiments, a managing user may view information for multiple target communicators in the toolkit 1000 without navigating away from the current target communicator on the main page. Also as in FIGS. 10A and 10B, the toolkit 1000 may be uncoupled from the main user interface, allowing the managing user to multitask and/or monitor the toolkit 1000 information for one target communicator while working on the campaign of another. For example, FIGS. 10A and 10B shows the swapper setting of the main user interface set to "target communicator 3" with user-directed and situation-dependent smart categories 111, optimization rails 1020, and targeting rails 1030 all directed to information for target communicator 3. The optimization rails 1020 include data analysis information for target communicator 3 such as "Recommendations," "Activity," "Bidding Snapshot," and "Goals." Targeting rails 1030 include information for target communicator 3 such as "Environment," "Audience," "Creatives," and "Device Type." In contrast, the site/app toolkit 1400 is directed toward target communicator 2.

Figure 15A:
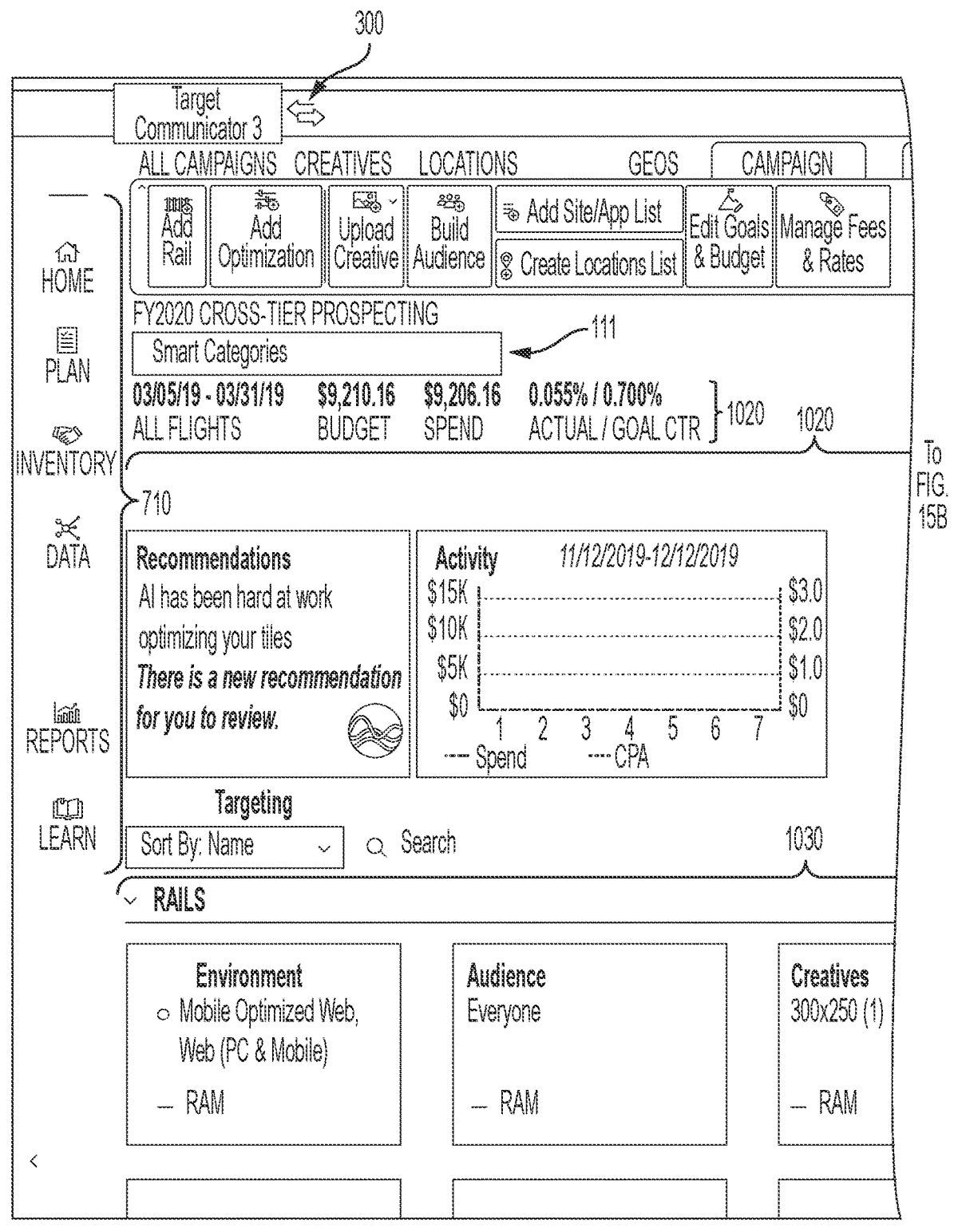
Figure 15B:
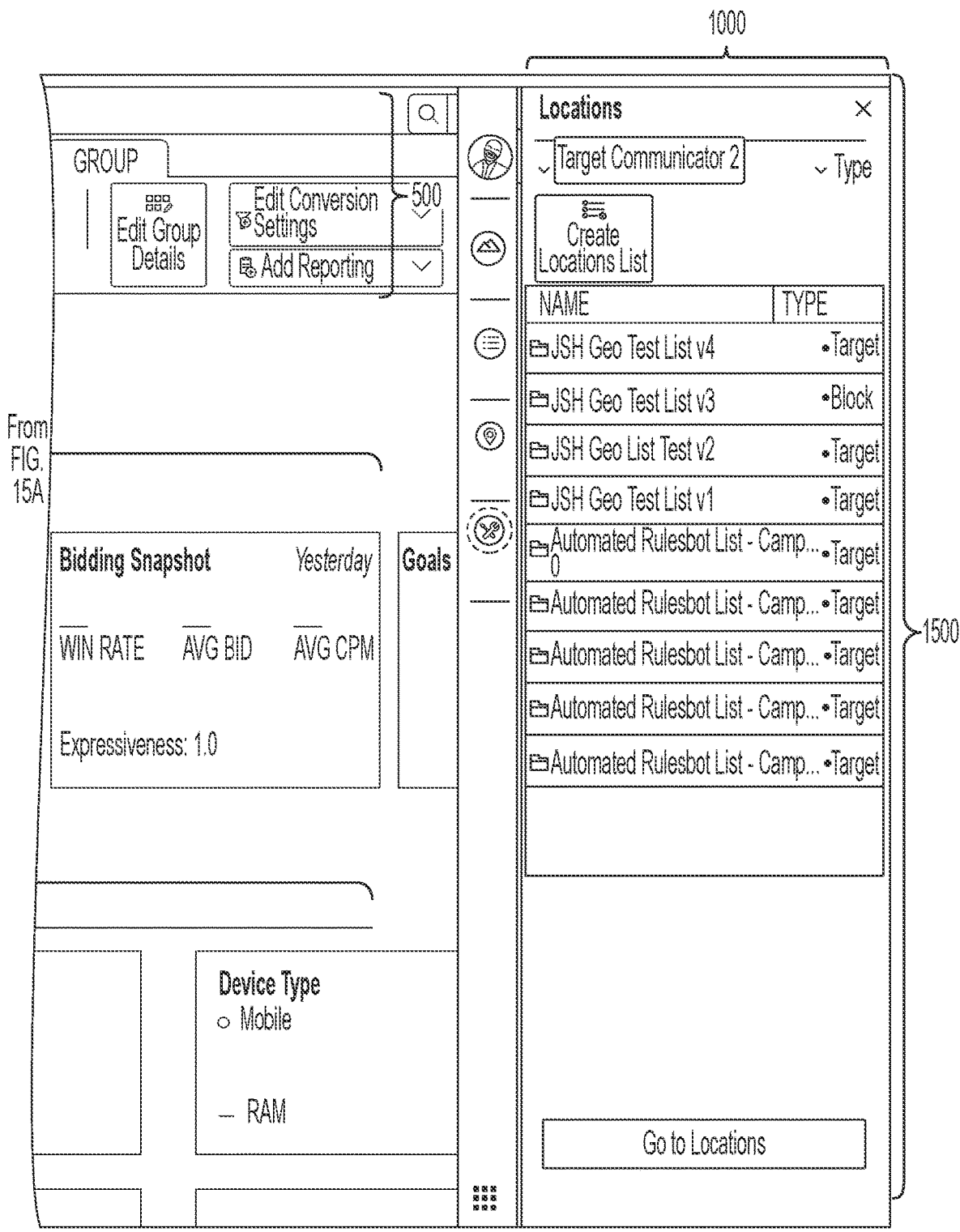
FIG. 15B shows the rightmost portion of an example of a locations toolkit, according to one embodiment.

As shown in FIGS. 15A and 15B, in some embodiments, the toolkit 1000 may contain a locations toolkit 1500 that gives the user a list of geographical locations in which a campaign should or should not be run. In some embodiments, the locations toolkit highlights lists of frequently used and currently used locations and provides context on how these lists affect campaign performance. In some embodiments, the locations toolkit highlights geographic locations that may improve campaign performance. In some embodiments, the locations toolkit allows the user to drag and drop a list of geographic locations into a new or existing campaign to quickly add the list to the campaign targeting rails. In some embodiments, the locations toolkit provides this additional information tailored to the currently selected target communicator or to the currently selected hub. As in FIGS. 10A and 10B, in some embodiments, a managing user may view information for multiple target communicators in the toolkit 1000 without navigating away from the current target communicator on the main page. Also as in FIGS. 10A and 10B, the toolkit 1000 may be uncoupled from the main user interface, allowing the managing user to multitask and/or monitor the toolkit 1000 information for one target communicator while working on the campaign of another. For example, FIGS. 10A and 10B shows the swapper setting of the main user interface set to "target communicator 3" with user-directed and situation-dependent smart categories 111, optimization rails 1020, and targeting rails 1030 all directed to information for target communicator 3. The optimization rails 1020 include data analysis information for target communicator 3 such as "Recommendations," "Activity," "Bidding Snapshot," and "Goals." Targeting rails 1030 include information for target communicator 3 such as "Environment," "Audience," "Creatives," and "Device Type." In contrast, the locations toolkit 1500 is directed toward target communicator 2.

Figure 16A:
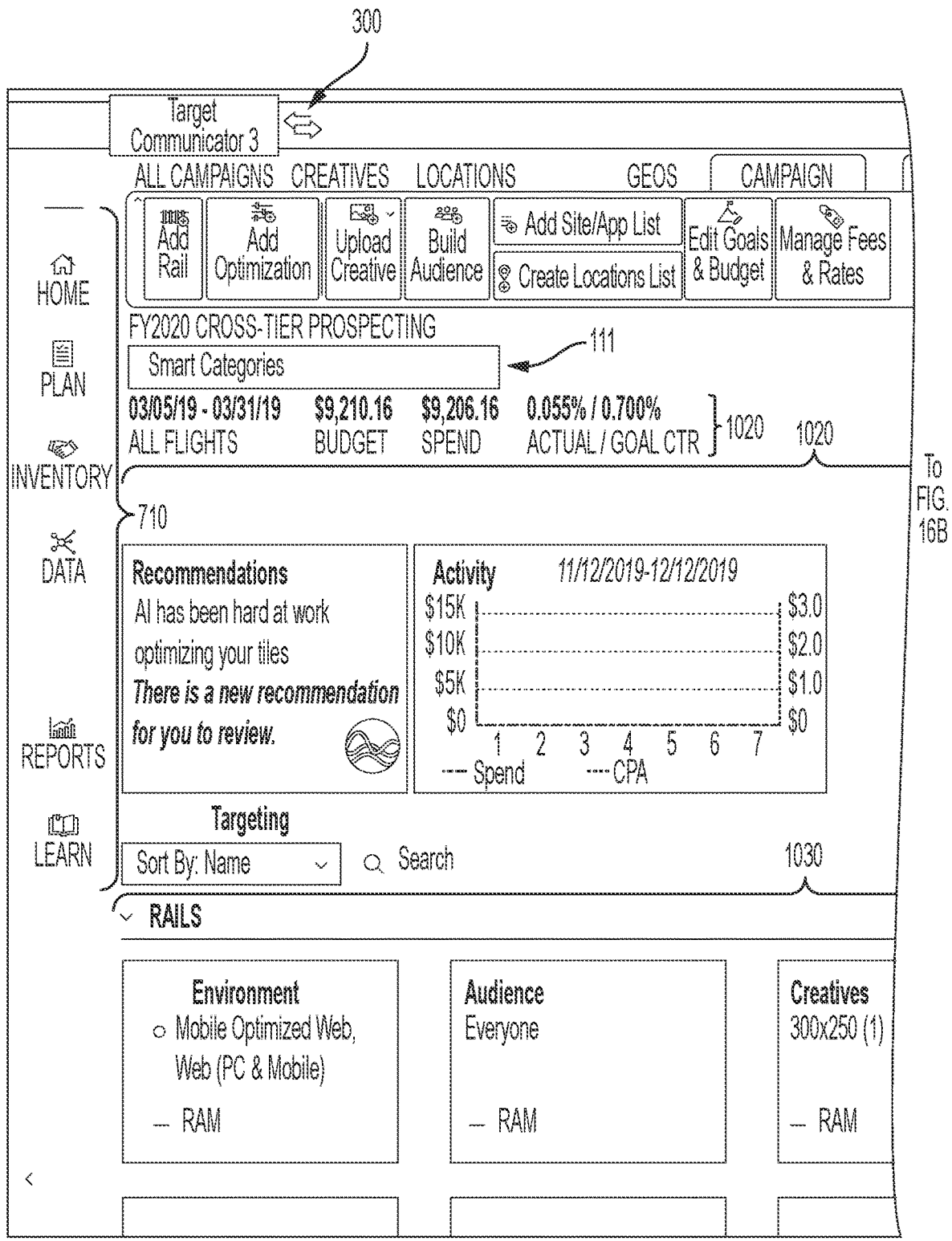
FIG. 16A shows the leftmost portion of an example of a tools toolkit, according to one embodiment.
Figure 16B:
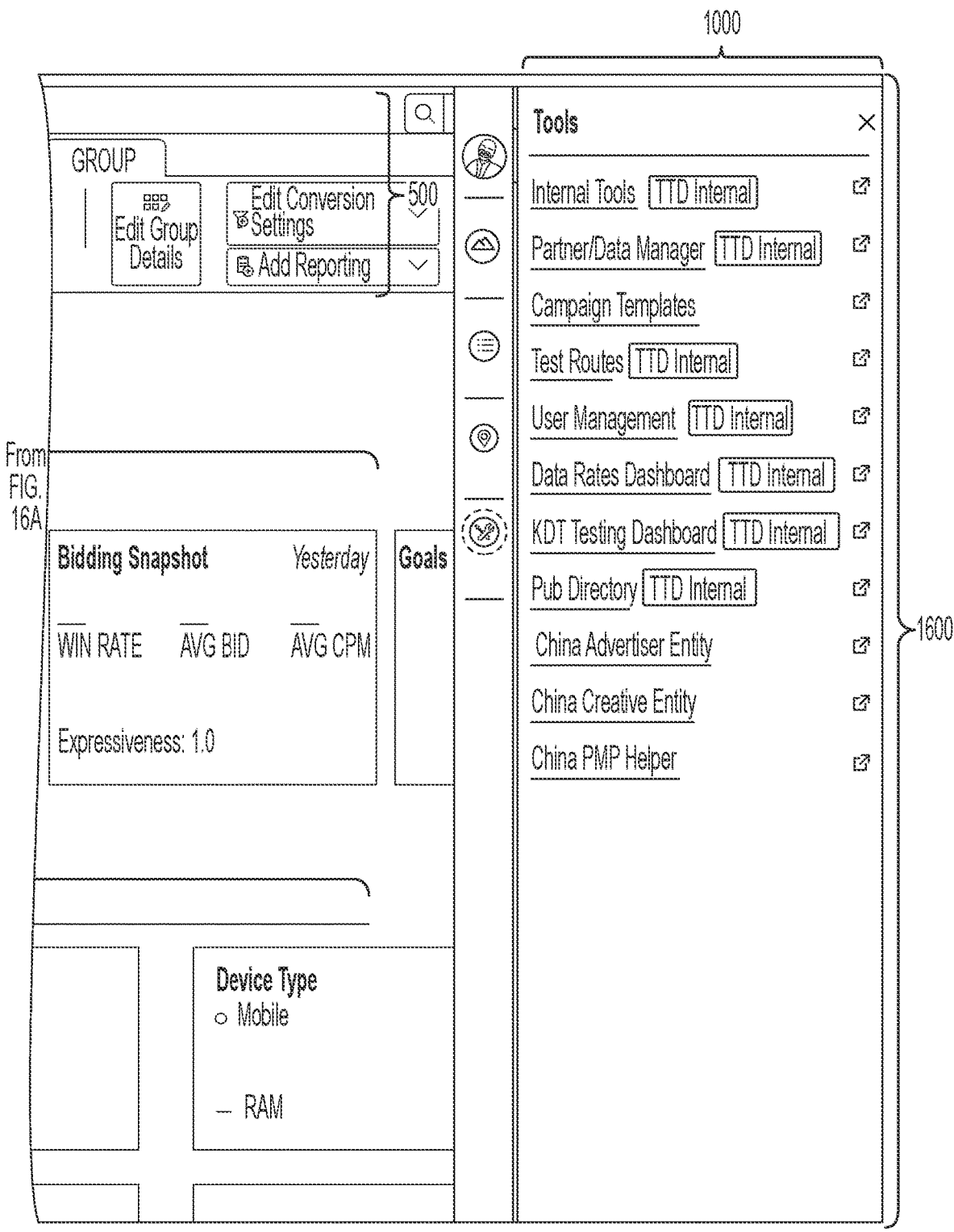
FIG. 16B shows the rightmost portion of an example of a tools toolkit, according to one embodiment.

As shown in FIGS. 16A and 16B, in some embodiments, the toolkit 1000 may contain a tools toolkit 1600 that allows the managing user to adjust user and account settings. In some embodiments, the tools toolkit allows access to administrative, power-user, and internal-user features such as user management, billing, internal testing tools, and dashboards. In some embodiments, the tools toolkit provides this additional information tailored to the currently selected target communicator or to the currently selected hub. As in FIGS. 10A and 10B, in some embodiments, a managing user may view information in the toolkit 1000 without navigating away from the current target communicator information on the main page. Also as in FIGS. 10A and 10B, the toolkit 1000 may be uncoupled from the main user interface, allowing the managing user to multitask and/or monitor the toolkit 1000 information while working on the campaign of a chosen target communicator. For example, FIGS. 10A and 10B shows the swapper setting of the main user interface set to "target communicator 3" with user-directed and situation-dependent smart categories 111, optimization rails 1020, and targeting rails 1030 all directed to information for target communicator 3. The optimization rails 1020 include data analysis information for target communicator 3 such as "Recommendations," "Activity," "Bidding Snapshot," and "Goals." Targeting rails 1030 include information for target communicator 3 such as "Environment," "Audience," "Creatives," and "Device Type." In contrast, the tools toolkit 1600 provides a set of universal tools.

Figure 17A:
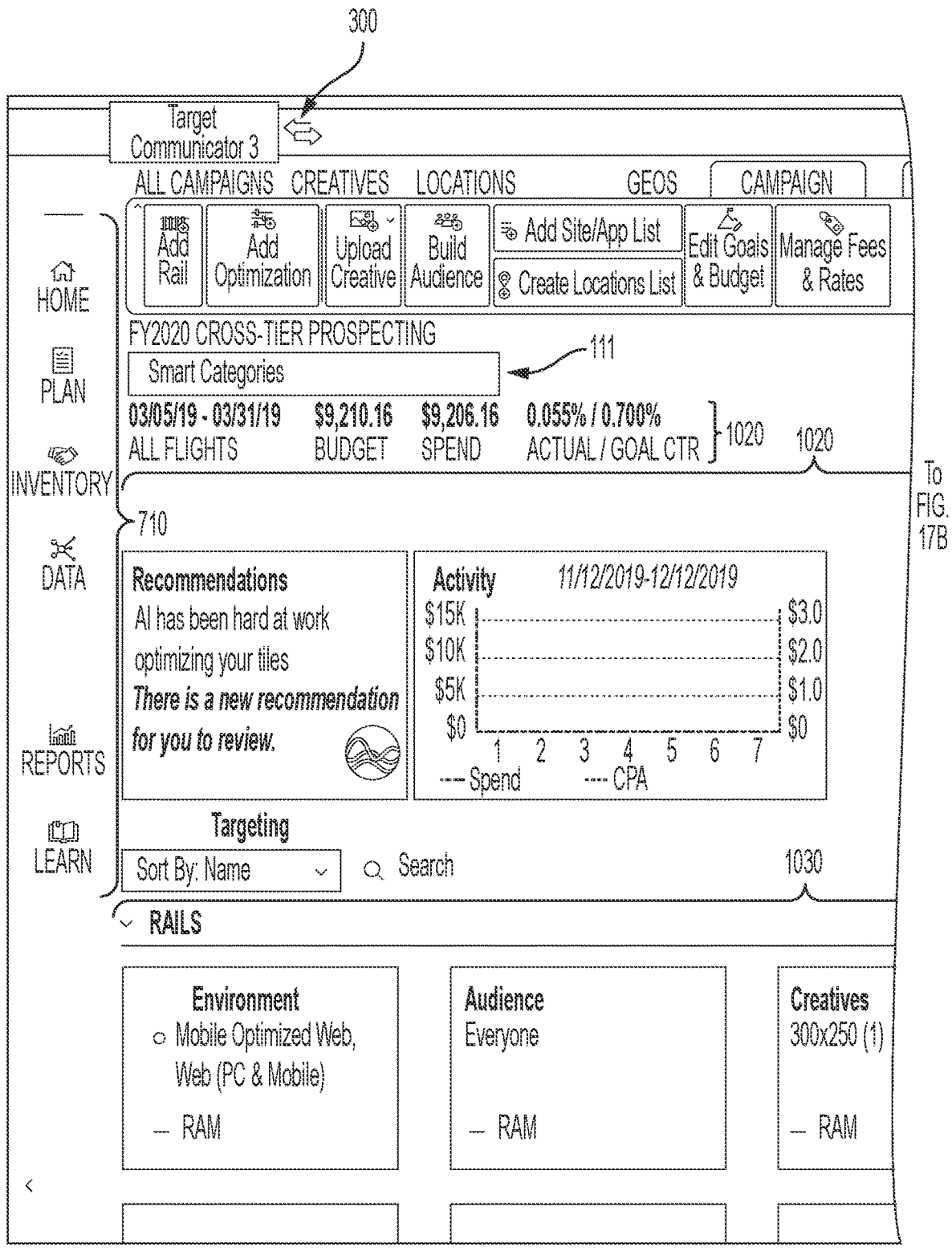
FIG. 17A shows the leftmost portion of an example of a profile toolkit, according to one embodiment.
Figure 17B:
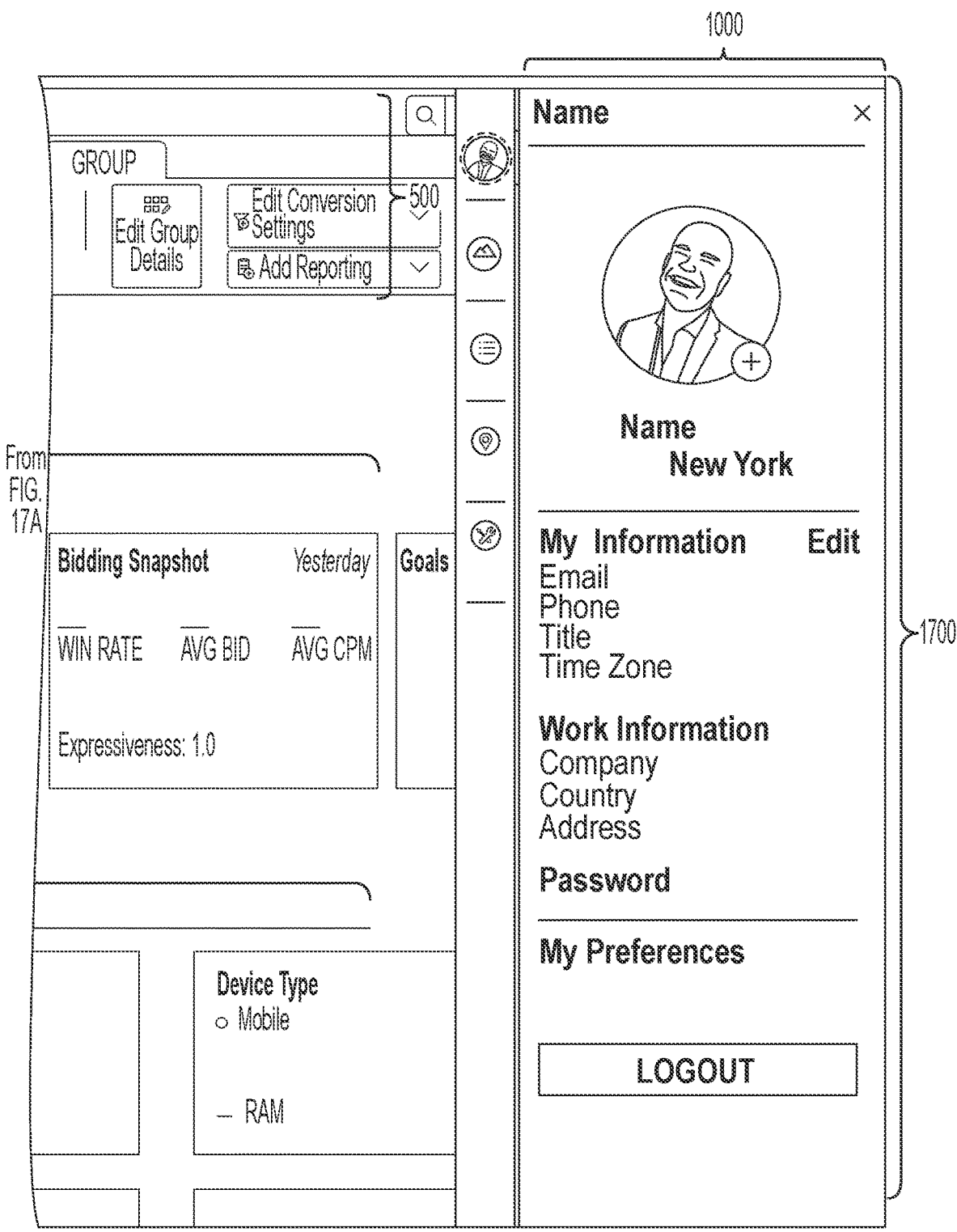
FIG. 17B shows the rightmost portion of an example of a profile toolkit, according to one embodiment.

As shown in FIGS. 17A and 17B, in some embodiments, the toolkit 1000 may contain a profile toolkit 1700 that allows the managing user to populate the account with information about the user and a user image. In some embodiments, the profile toolkit shows profile information. In some embodiments, the profile toolkit gives shortcuts to password and security management. In some embodiments, the profile toolkit shows a list of tasks. In some embodiments, the profile toolkit provides this additional information tailored to the currently sign-in user. As in FIGS. 10A and 10B, in some embodiments, a managing user may view information in the toolkit 1000 without navigating away from the current target communicator information on the main page. Also as in FIGS. 10A and 10B, the toolkit 1000 may be uncoupled from the main user interface, allowing the managing user to multitask and/or monitor the toolkit 1000 information while working on the campaign of a chosen target communicator. For example, FIGS. 10A and 10B shows the swapper setting of the main user interface set to "target communicator 3" with user-directed and situation-dependent smart categories 111, optimization rails 1020, and targeting rails 1030 all directed to information for target communicator 3. The optimization rails 1020 include data analysis information for target communicator 3 such as "Recommendations," "Activity," "Bidding Snapshot," and "Goals." Targeting rails 1030 include information for target communicator 3 such as "Environment," "Audience," "Creatives," and "Device Type." In contrast, the profile toolkit 1700 provides information and tools regarding the managing user's personal information.

Figure 18:
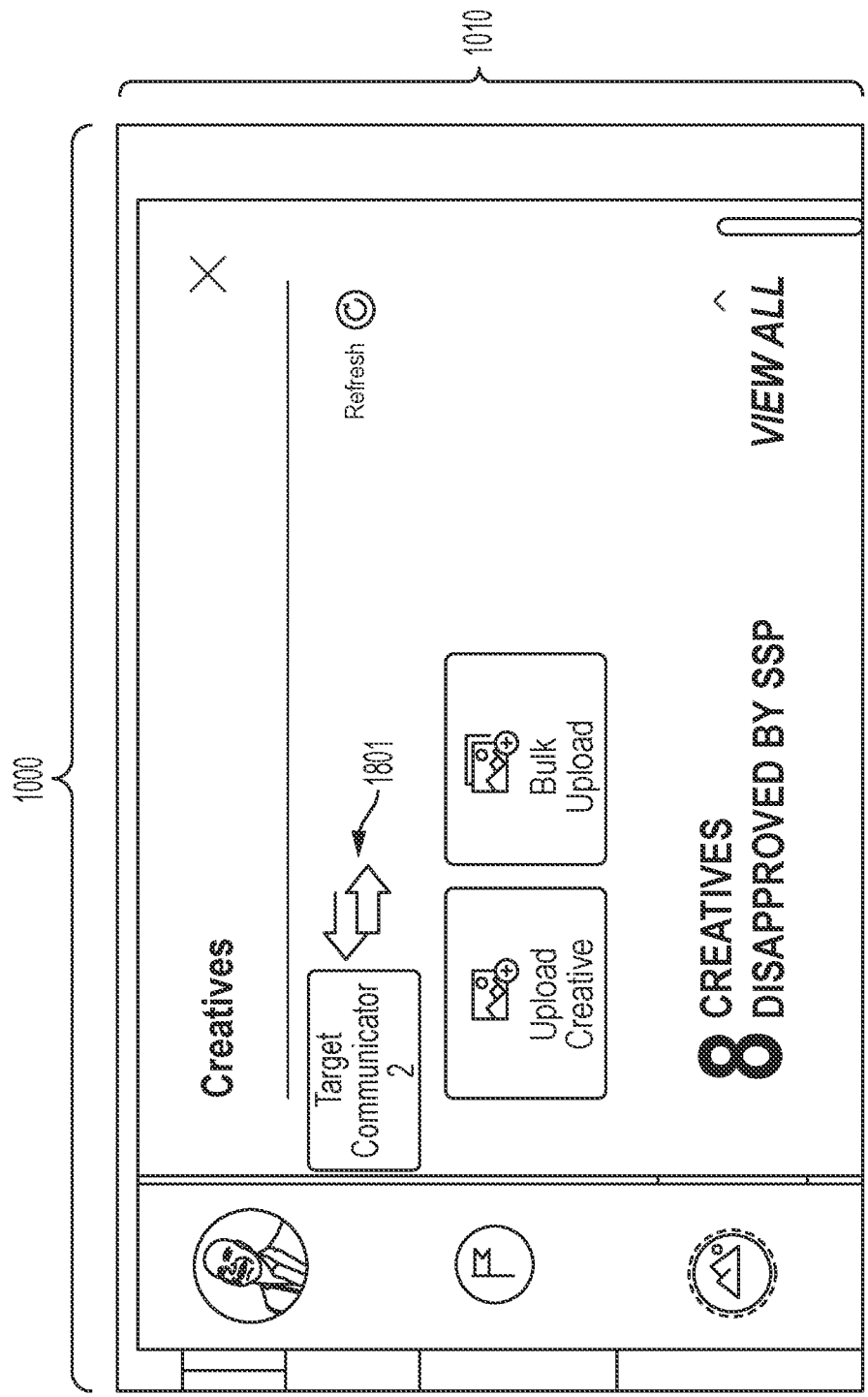
FIG. 18 shows an example of a mini swapper, according to one embodiment.

As shown in FIG. 18, in some embodiments, the toolkit contains a mini-swapper 1801 that shows which target communicator's information is populating the panel. The mini-swapper allows switching which target communicator's information is being displayed without navigating the rest of the chrome away from the current target communicator. It shows target communicators for the currently selected communicator hub in the header swapper. The header's target communicator may also be selected in the mini-swapper by default. Whenever the header swapper is changed, the mini-swapper may change to follow suit. If the header swapper is changed to a communicator hub-level selection, the mini-swapper may select the managing user's first favorite target communicator. If the managing user has no favorite target communicators, then the first target communicator in the "All target communicator" list may be selected. If the communicator hub has no target communicators, the mini-swapper may be inactive and display a "No target communicators found" watermark. Alternatively, the entire creatives panel may be blank and display a "Please create a target communicator to show their creative content here" watermark. "Create a target communicator" is a link to the target communicator creation flow. The link may be active for managing users with target communicator creation permissions.

Figure 19:
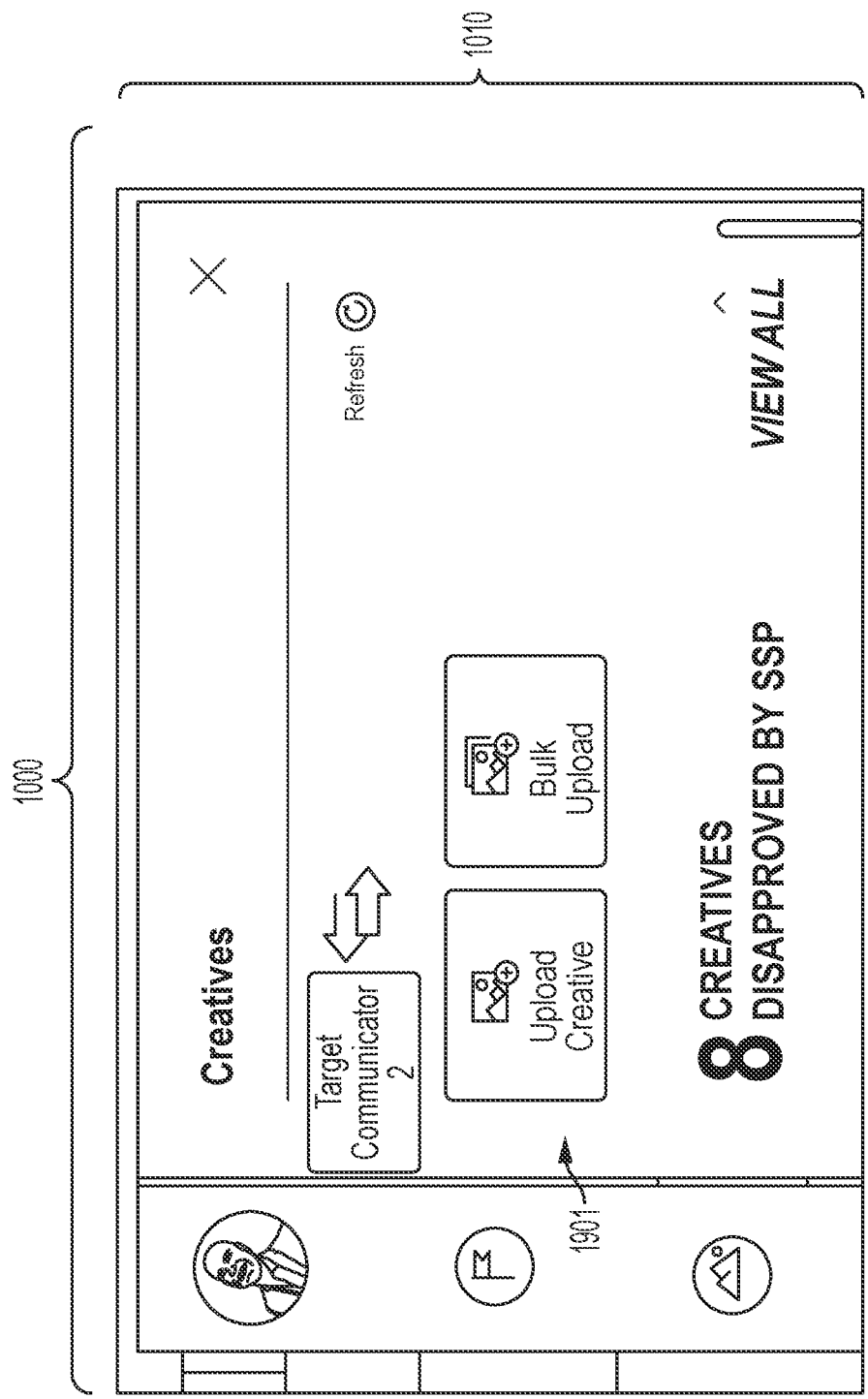
FIG. 19 shows an example of an action button, according to one embodiment.

As shown in FIG. 19, in some embodiments, the toolkit 1000 may contain action buttons 1901. In the case of the creative toolkit 1010, the action buttons 1901 may include "upload creative" and "bulk upload" buttons. The buttons may be available if the managing user has creatives editing permission for the target communicator in the mini-swapper. The Upload creative button may open the "Add Creative" popup from the creative library. The Bulk upload button may open the "Bulk Import" popup from the creative library.

Figure 20:
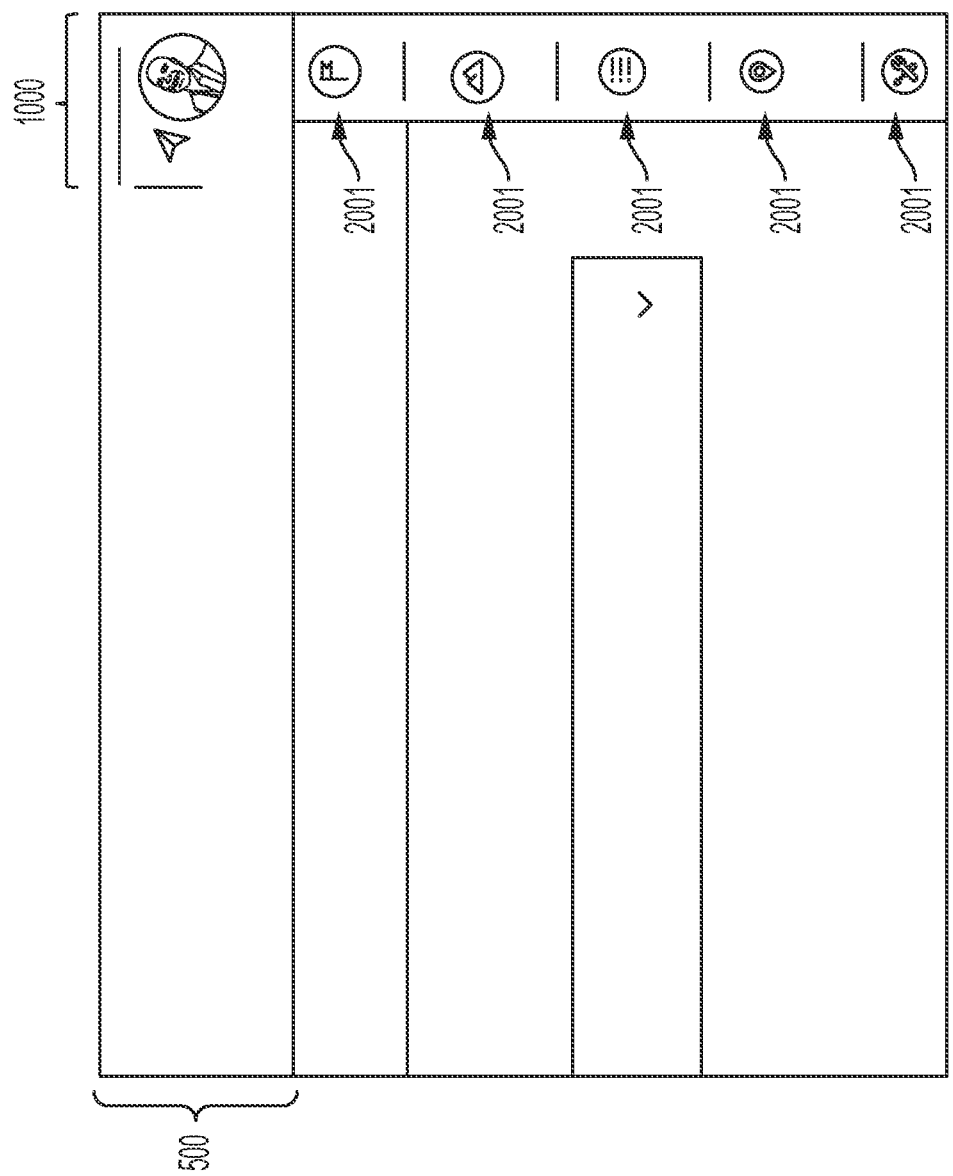
FIG. 20 shows an example of toolkit tokens on the toolkit, according to one embodiment.

As shown in FIG. 20, in some embodiments, tokens 2001 may be visible when the toolkit 1000 is not actively being used. These tokens 2001 may have symbols that represent the various toolkit options. As with the toolkit 1000, the tokens 2001 are not limited to the left side of the interface, but may be present at any location.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference in the specification to "one embodiment" or "an embodiment" means that a particular feature, structure, or characteristic described in connection with the embodiment is included in at least one embodiment of the disclosure. The appearances of the phrase "in one embodiment," or "in some embodiments" in various places in the specification are not necessarily all referring to the same implementation or embodiment.

Moreover, the above descriptions of the embodiments of the present disclosure have been presented for the purposes of illustration and description. It is not intended to be exhaustive or to limit the present disclosure to the precise form disclosed. Many modifications and variations are possible in light of the above teaching. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure.

What is claimed is:

1. A method for bypassing data hierarchies in providing data associated with objects, the method comprising:
    providing, using one or more computing device processors, a primary set of objects;
    receiving, using the one or more computing device processors, a selection of a first object from the primary set of objects;
    in response to receiving the selection of the first object from the primary set of objects, providing, using the one or more computing device processors, a secondary set of objects based on the selection of the first object from the primary set of objects;
    receiving, using the one or more computing device processors, a selection of a second object from the secondary set of objects;
    in response to receiving the selection of the second object from the secondary set of objects, providing, using the one or more computing device processors, first data associated with the second object, wherein the first data associated with the second object is associated with or comprises a first data hierarchy associated with the second object;
    receiving, using the one or more computing device processors, a selection of first category data from the first data associated with the second object;
    in response to receiving the selection of the first category data from the first data associated with the second object, providing, using the one or more computing device processors, the first category data associated with the second object;
    receiving, using the one or more computing device processors, a selection of a third object from the secondary set of objects;
    in response to receiving the selection of the third object from the secondary set of objects, bypassing, using the one or more computing device processors, a second data hierarchy associated with the third object and providing, using the one or more computing device processors, second category data associated with the third object without receiving a selection of the second category data associated with the third object prior to providing the second category data associated with the third object; and
    providing, using the one or more computing device processors, a first toolkit associated with at least one of the first object, the second object, or the third object.

2. An apparatus for bypassing data hierarchies in providing data associated with objects, the apparatus comprising one or more hardware computing device processors configured to:
    provide a primary set of objects;
    receive a selection of a first object from the primary set of objects;
    in response to receiving the selection of the first object from the primary set of objects, provide a secondary set of objects based on the selection of the first object from the primary set of objects;
    receive a selection of a second object from the secondary set of objects;
    in response to receiving the selection of the second object from the secondary set of objects, provide first data associated with the second object, wherein the first data associated with the second object is associated with or comprises a first data hierarchy associated with the second object;
    receive a selection of first category data from the first data associated with the second object;
    in response to receiving the selection of the first category data from the first data associated with the second object, provide the first category data associated with the second object;
    receive a selection of a third object from the secondary set of objects;
    in response to receiving the selection of the third object from the secondary set of objects, bypass a second data hierarchy associated with the third object and provide second category data associated with the third object without receiving a selection of the second category data associated with the third object prior to providing the second category data associated with the third object; and
    provide a first toolkit associated with at least one of the first object, the second object, or the third object.

3. The apparatus of claim 2, wherein the apparatus comprises at least one of a server or a computing apparatus associated with a user.

4. A method for bypassing data hierarchies in providing data associated with objects, the method comprising:

providing, using one or more computing device processors, a primary set of objects;

receiving, using the one or more computing device processors, a selection of a first object from the primary set of objects;

in response to receiving the selection of the first object from the primary set of objects, providing, using the one or more computing device processors, a secondary set of objects based on the selection of the first object from the primary set of objects;

receiving, using the one or more computing device processors, a selection of a second object from the secondary set of objects;

in response to receiving the selection of the second object from the secondary set of objects, providing, using the one or more computing device processors, first data associated with the second object, wherein the first data associated with the second object is associated with or comprises a first data hierarchy associated with the second object;

receiving, using the one or more computing device processors, a selection of first category data from the first data associated with the second object;

in response to receiving the selection of the first category data from the first data associated with the second object, providing, using the one or more computing device processors, the first category data associated with the second object;

receiving, using the one or more computing device processors, a selection of a third object from the secondary set of objects;

in response to receiving the selection of the third object from the secondary set of objects, bypassing, using the one or more computing device processors, a second data hierarchy associated with the third object and providing, using the one or more computing device processors, second category data associated with the third object without receiving a selection of the second category data associated with the third object prior to providing the second category data associated with the third object; and providing or initiating display of, using the one or more computing device processors, a first toolkit associated with at least one of the first object, the second object, or the third object.

5. The method of claim 4, further comprising providing an optimization rail or a targeting rail associated with the least one of the first object, the second object, or the third object.

6. The method of claim 4, wherein the first toolkit comprises one or more action options associated with the least one of the first object, the second object, or the third object.

7. The method of claim 6, wherein the one or more action options are based on a permission associated with a user of the first toolkit.

8. The method of claim 4, wherein the first toolkit comprises a creative asset associated with the least one of the first object, the second object, or the third object, wherein the creative asset is a component of a targeted communication associated with the least one of the first object, the second object, or the third object.

9. The method of claim 8, wherein the first toolkit enables interaction or modification of the creative asset, wherein the creative asset comprises media data, image data, or text data.

10. The method of claim 8, further comprising providing an information panel for managing the creative asset, wherein the information panel provides an alert associated with the creative asset and a reason associated with the alert.

11. The method of claim 4, wherein the first toolkit provides an alert or notification associated with the at least one of the first object, the second object, or the third object.

12. The method of claim 4, wherein the first toolkit provides performance data for a targeted communication associated with the at least one of the first object, the second object, or the third object.

13. The method of claim 4, wherein the first toolkit provides website or application data for a targeted communication associated with the at least one of the first object, the second object, or the third object.

14. The method of claim 4, wherein the first toolkit provides location data for a targeted communication associated with the at least one of the first object, the second object, or the third object.

15. The method of claim 4, wherein the first toolkit enables modification of a user or account setting or a user or account profile.

16. The method of claim 4, wherein the first toolkit comprises a swapper option that enables switching between second data associated with the second object and third data associated with the third object.

17. The method of claim 4, wherein the first toolkit displays second data associated with the second object when a first user interface in communication with the first toolkit displays third data associated with the second object.

18. The method of claim 4, wherein the first toolkit displays one or more tokens when the first toolkit is not being actively interacted with.

19. The method of claim 4, wherein the first toolkit is coupled to a first user interface associated with the least one of the first object, the second object, or the third object.

20. The method of claim 4, wherein the first toolkit is uncoupled from a first user interface associated with the least one of the first object, the second object, or the third object.

* * * * *